United States Patent
Hosokawa et al.

(10) Patent No.: US 6,349,704 B2
(45) Date of Patent: Feb. 26, 2002

(54) ENGINE CONTROL APPARATUS

(75) Inventors: Kouji Hosokawa, Higashimurayama; Kousaku Shimada; Seiji Asano, both of Hitachinaka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/842,192

(22) Filed: Apr. 26, 2001

Related U.S. Application Data

(63) Continuation of application No. 09/201,830, filed on Dec. 1, 1998, now Pat. No. 6,223,728.

(30) Foreign Application Priority Data

Dec. 1, 1997 (JP) ............................................. 9-329864

(51) Int. Cl.[7] ............................................. F02M 51/00
(52) U.S. Cl. ..................................... 123/478; 123/480
(58) Field of Search ................................. 123/478, 480, 123/482, 350, 681, 682

(56) References Cited

U.S. PATENT DOCUMENTS

| | | | | |
|---|---|---|---|---|
| 4,773,375 A | * | 9/1988 | Okino et al. ................. | 123/488 |
| 4,971,011 A | * | 11/1990 | Nanyoshi et al. ............ | 123/436 |
| 5,305,723 A | * | 4/1994 | Kadota ......................... | 123/479 |
| 5,485,821 A | * | 1/1996 | Yoshizawa ................... | 123/478 |
| 5,529,043 A | * | 6/1996 | Nagaishi et al. ............. | 123/478 |
| 5,803,048 A | * | 9/1998 | Yano et al. .................. | 123/443 |

FOREIGN PATENT DOCUMENTS

JP     7-301139     11/1995

* cited by examiner

Primary Examiner—Henry C. Yuen
Assistant Examiner—Mahmoud Gimie
(74) Attorney, Agent, or Firm—Crowell & Moring LLP

(57) ABSTRACT

The variation of the A/F ratio and the deterioration of driving feeling or exhaust owing to the response delay of air intake against the fuel injection is suppressed, in an engine control apparatus for controlling an intake air flow based on the torque or the fuel injection amount. The apparatus causes the phase of fuel injection to fit to that of air intake. In order to fit the phase of fuel injection to that of air intake, an apparatus for delaying the fuel injection or an apparatus for speeding up the air intake is used.

40 Claims, 23 Drawing Sheets

ENGINE CONTROL APPARATUS

This application is a continuation of application Ser. No. 09/201,830, filed Dec. 1, 1998, now U.S. Pat. No. 6,223,728.

BACKGROUND OF THE INVENTION

The present invention relates to an engine control apparatus for controlling an intake air flow based on torque or a fuel injection amount, particularly to an engine control apparatus which can obtain suitable air/fuel ratio in any operating conditions.

The typical engine control apparatus is disclosed, for example, in Japanese Patent Application Laid-Open No. 7-301139 (1995).

In the prior art, the fuel injection is performed after at least two parameters is selected among the timing of the fuel injection, the ratio of air to fuel (A/F ratio), the timing of ignition and the air flow, based on the target torque calculated according to the operating condition, and thereby controlling the engine so as to improve the fuel consumption and the feeling of run.

However, the above prior art does not disclose the timing of the fuel injection and air intake. Therefore, in particular, there is a fear that the variation of the A/F ratio and the deterioration of driving feeling or exhaust occurs, owing to the response delay of air intake against the fuel injection in the transient state of the intake air flow control performed based on the torque or the fuel injection amount.

SUMMARY OF THE INVENTION

An object of the present invention is to suppress the variation of the A/F ratio and the deterioration of driving feeling or exhaust owing to the response delay of air intake against the fuel injection, in an engine control apparatus for controlling an intake air flow based on the torque or the fuel injection amount.

The above object is attained by fitting the phase of fuel injection to that of air intake. In order to fit the phase of fuel injection to that of air intake, the present invention adopts a method of delaying the fuel injection or a method of speeding up the air intake.

In the former method, time-filtering for the fuel injection amount is performed.

Concretely, an engine control apparatus according to an embodiment of the present invention has a means for calculating the width of a reference pulse used as the reference when a fuel injection pulse width is calculated based on operating conditions, a means for calculating the target A/F ratio based on the operating conditions, a means for calculating the target throttle opening based on the operating condition including the target A/F ratio, and a fuel injection phase correcting means for calculating the width of a filtering reference pulse by time-filtering the reference pulse width.

The fuel injection amount is calculated based on the filtering reference pulse width and the fuel injection control is performed.

In the latter method, an electronically controlled throttle is used to control the intake air flow. Further, the feedback constant is controlled when feedback-controlling the opening of the electronically controlled throttle.

Concretely, an engine control apparatus according to another embodiment of the present invention has a means for calculating the width of a reference pulse used as the reference when a fuel injection pulse width is calculated based on operating conditions, a means for calculating the target A/F ratio based on the operating conditions, a means for calculating the target throttle opening based on the operating condition including the target A/F ratio. Further, the target throttle opening calculating means includes a means for calculating or detecting a cylinder intake air flow, a means for calculating the target air flow, a means for feedback-calculating the target throttle opening by using the feedback control in which the cylinder intake air flow is allowed to follow the target air flow, and a means for setting the feedback constant of the target throttle opening feedback calculating means in accordance with the operating condition.

While the variation of the fuel injection amount is reflected instantaneously on the fuel injection apparatus in the transient state of the engine control apparatus which controls the intake air flow based on the torque or the fuel injection amount, the variation of the cylinder intake air flow is behind the variation of the fuel injection amount owing to the time lag required to pass through the intake pipe or the time lag necessary for the variation of the inner pressure of the intake pipe.

With regard to the above problem, in the case that the time-filtering is applied to the fuel injection amount, or the electronically controlled throttle is used for the control of the intake air flow and further the opening of the electronically controlled throttle is feedback-controlled, it becomes possible to fit the phases of the fuel injection and the air intake to each other, and thus suppress the variation of the A/F ratio and the deterioration of the drive feeling or exhaust.

DESCRIPTION OF THE PREFERRED EMBODIMENTS

Embodiments of the present invention will be explained in detail hereinafter with reference to the drawings.

Figure 2:
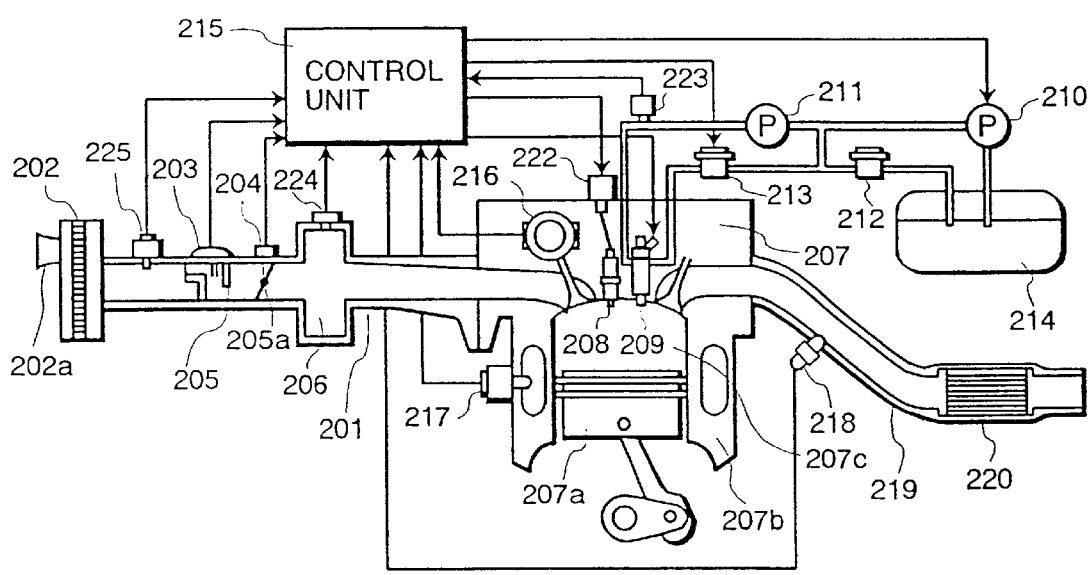
FIG. 2 is a schematic diagram of an in-cylinder injection engine system to which the present invention is applied.

Now, FIG. 2 is a schematic diagram of an in-cylinder injection engine system to which the present invention is applied. In FIG. 2, the air aspirated into an engine passes from an inlet portion 202a of an air cleaner 202 to a collector 206 via an intake air temperature sensor 225, an air flow sensor 203 and a throttle body housing a throttle valve 205 for controlling the intake air flow. An intake pipe pressure sensor 224 is provided on the side of a cylinder. The intake air is distributed into the intake pipes each connected to each of the cylinders of an engine 207, and introduced to the inside of the cylinders.

While, fuel such as gasoline is pumped up from a fuel tank 214, a primary pressure is applied by a fuel pump 210 and a secondary pressure by a fuel pump 211. The pressurized fuel is supplied to a fuel system having an injector 209. The primarily-pressurized fuel is adjusted to become a constant pressure (ex. 3 kg/cm²) by a fuel-pressure regulator 212, and the higher secondarily-pressurized fuel is also adjusted to become a constant pressure (ex. 50 kg/cm²). Then, the pressurized fuel is injected into the cylinder from the injector 209 provided in each cylinder. The injected fuel is ignited by an ignition plug 208 receiving an high voltage ignition signal supplied from an ignition coil 222.

A control unit 215 inputs a signal indicative of the temperature of the intake air from the intake air temperature sensor 225, a signal indicative of the intake air flow from the air flow sensor 203, and a signal indicative of the inner pressure of the intake pipe from the intake pipe pressure sensor 224. The throttle body has a throttle sensor 204 for detecting the opening of the throttle valve 205a. An output of the throttle sensor 204 is also input to the control unit 215.

Further, reference numeral 216 designates a crank shaft mounted on an axis of a cam shaft, for outputting an angle signal POS for the detection of a rotation signal (indicative of engine speed) and a reference angle signal REF indicative of the rotational position of the crank shaft. These signals are also input to the control unit 215.

Reference numeral 218 designates an A/F sensor provided before a catalyst 220 in an exhaust pipe 219. An output signal of the A/F sensor is also input to the control unit 215.

Further, a fuel pressure sensor 223 is provided inside of the secondarily pressurized piping. An output signal of the fuel pressure sensor is also input to the control unit 215.

Figure 3:
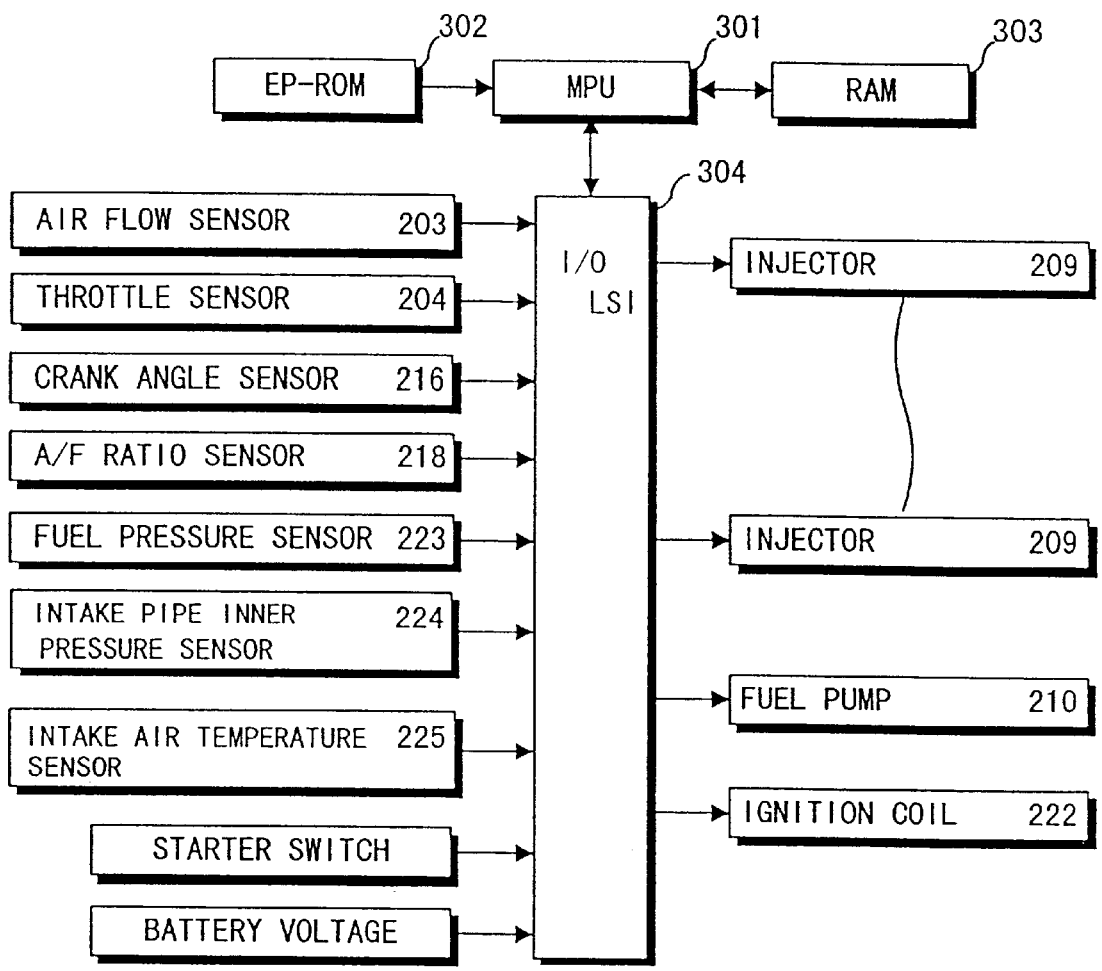
FIG. 3 is a schematic diagram of a control unit to which the present invention is applied.

As shown in FIG. 3, a major part of the control unit 215 comprises an MPU 301, a ROM 302, a RAM 303 and an I/O LSI 304 including an A/D converter. The control unit 215 inputs signals from various sensors for detecting the operating conditions of the engine, carries out the predetermined arithmetic processing, and supplies the predetermined control signals to the injector 209 and the ignition coil 222. As described above, the controls of the amount of fuel supply and the ignition timing are performed.

Figure 4:
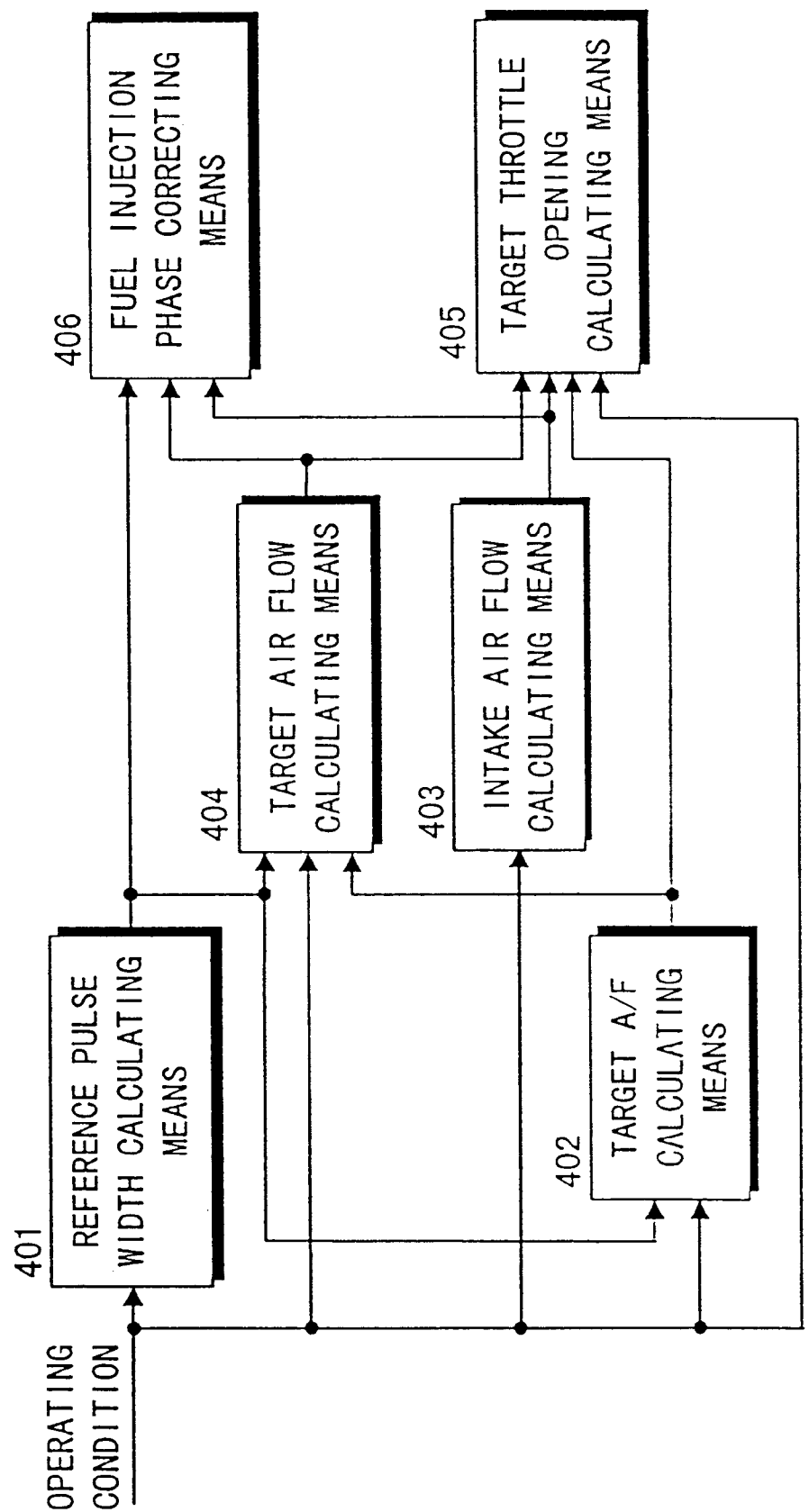
FIG. 4 is a control block diagram of the present invention.

FIG. 4 is a control block diagram showing the fuel injection control and the air intake control performed in the control unit 215 of the in-cylinder injection engine as described above. While the configuration of FIG. 4 comprises a reference pulse width calculating means 401, a target A/F ratio calculating means 402, an intake air flow calculating means 403, a target air flow amount calculating means 404, a target throttle opening calculating means 405 and a fuel injection phase correcting means 406, it may eliminate either or both of the intake air flow calculating means 403 and the target air flow amount calculating means 404 from the above configuration.

Figure 1:
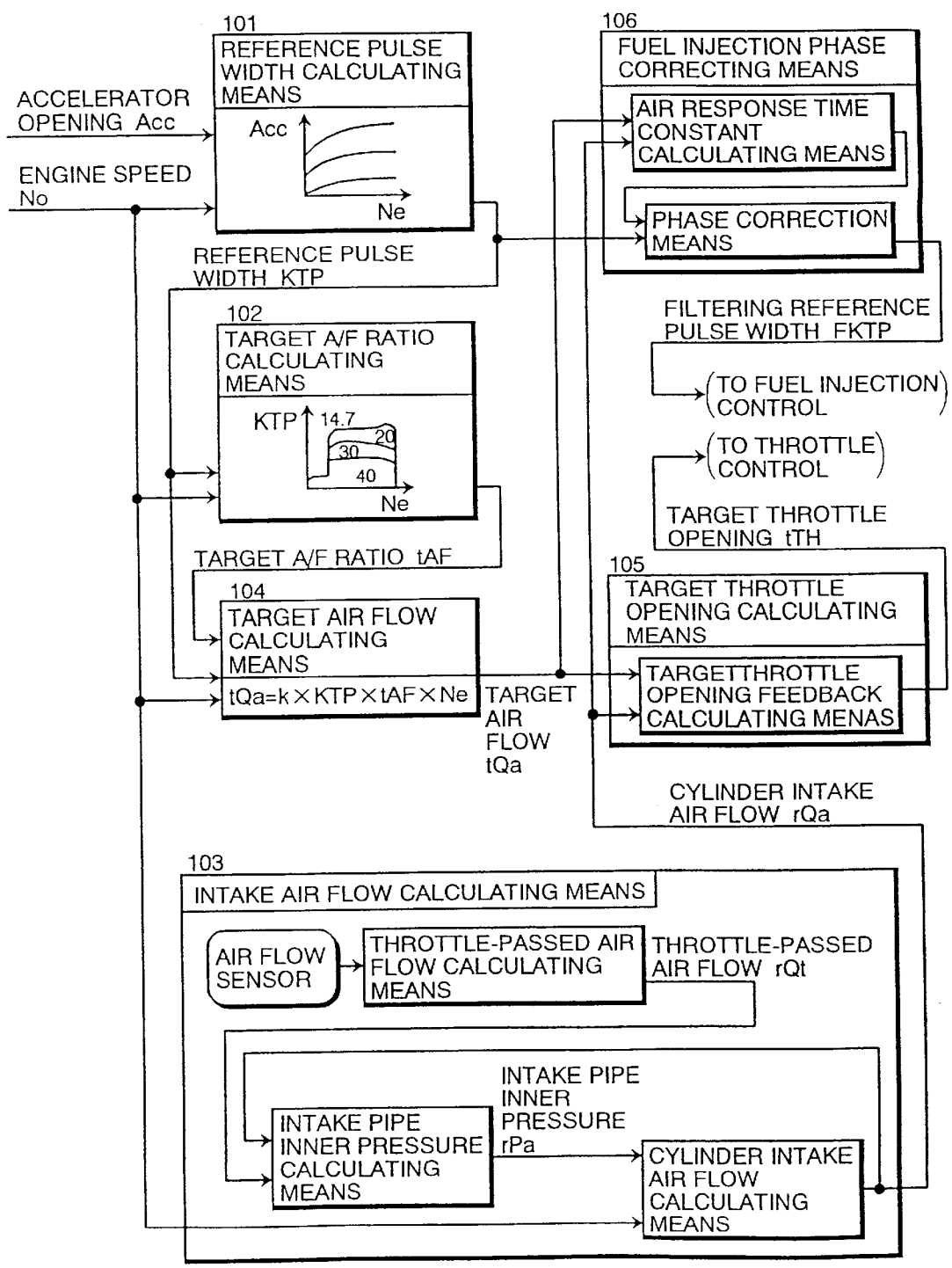
FIG. 1 is a control block diagram according to an embodiment of the present invention.

The configuration of FIG. 1 is an example of an apparatus having the whole components of FIG. 4. The configuration of FIG. 1 will be explained in detail hereinafter.

In the reference pulse width calculating means 101, the reference pulse width KTP is obtained by referring a map based on the accelerator opening Acc and the engine speed Ne. the reference pulse width KTP is a reference value used when the width TI of fuel injection pulse is calculated. The pulse width TI is calculated, for example, by equation 1.

$$TI = KTP \times COEF \times GAMMA \tag{1}$$

Where, COEF is a fuel correction coefficient of open loop which acts according to the operation conditions such as a transient state and an after-starting state, and GAMMA is a A/F feedback coefficient.

In the target A/F ratio calculating means 102, the target A/F ratio tAF is obtained by referring a map based on the engine speed Ne and the reference pulse width KTP.

Figure 5:
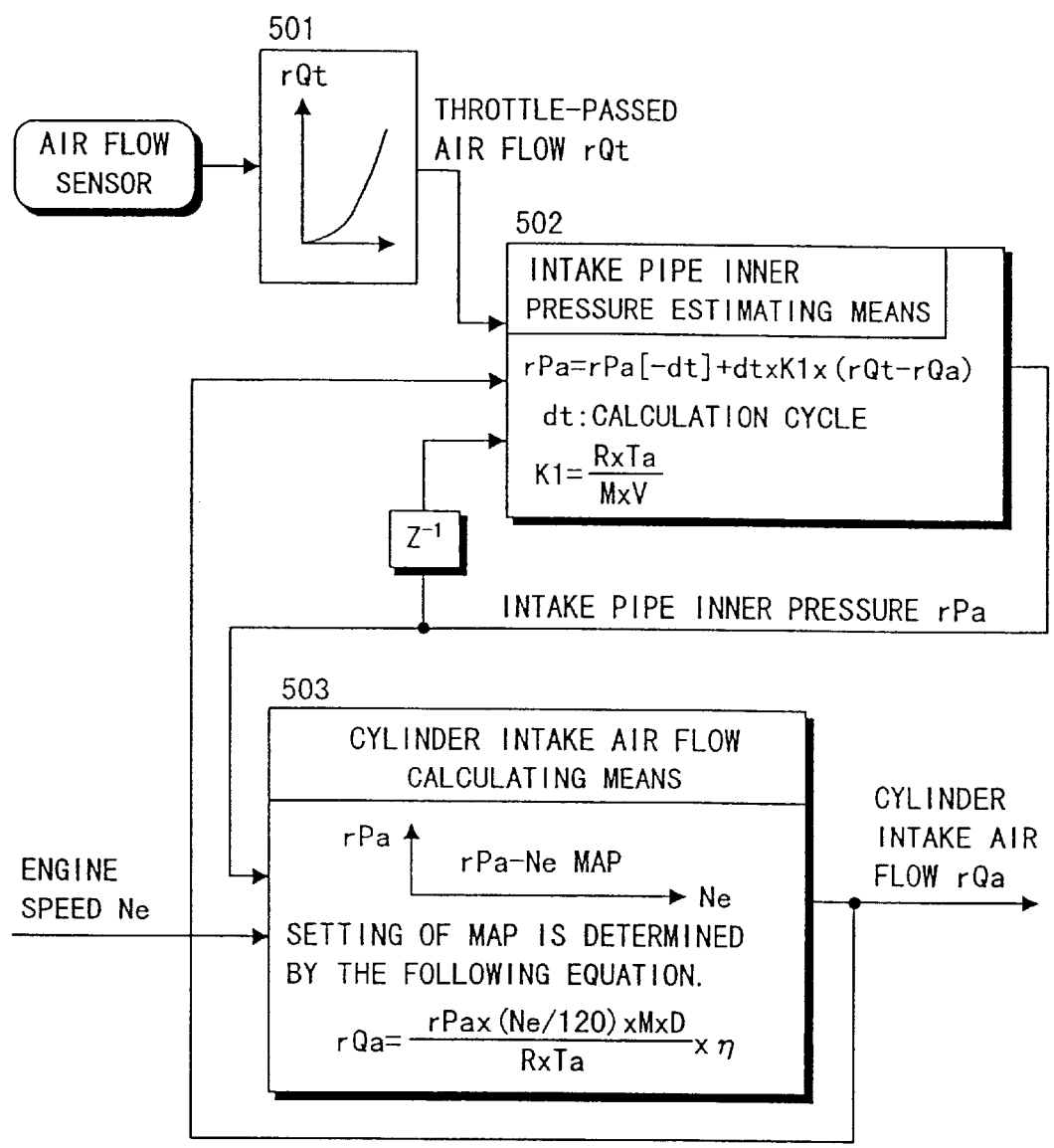
FIG. 5 is a control block diagram of the intake air flow calculating means.

In the intake air flow calculating means 103, the cylinder intake air flow rQa is calculated from the throttle-passed air flow rQt which is an output of the air flow sensor. The details of the control is shown in FIG. 5.

First, the output of the air flow sensor is converted into the throttle-passed air flow rQt by using a voltage-mass flow conversion table 501. Then, the inner pressure rPa of the intake pipe is calculated from the convertethrottle-passed air flowd rQt, the cylinder intake air flow rQa, and the previously calculated value rPa[−dt] of the inner pressure of the intake pipe by an intake inner pressure estimating means 502. The equation carried out in the intake pipe inner pressure estimating means 502 is obtained as follows.

The gradient of the inner pressure of the intake pipe is proportional to the difference between the throttle-passed air flow rQt and the cylinder intake air flow rQa. The equation (2) represents the relationship mentioned above. A proportion coefficient K1 is introduced from the state equation of ideal gas, and is expressed as equation (3).

$$d(rPa)/dt = K1 \times (rQt - rQa) \tag{2}$$

$$K1 = R \times Ta / M \times V \tag{3}$$

Where, R is a gas constant, Ta temperature of the intake air, M average molecular weight of the air and V volume from the throttle to the cylinder.

The following equation (4) is obtained by developing the equation (2) for use of the digital processing. The inner pressure rPa of the intake pipe is obtained by the equation (4).

$$rPa=rPa[-dt]+dt \times K1 \times (rQt-rQa) \qquad (4)$$

Figure 6:
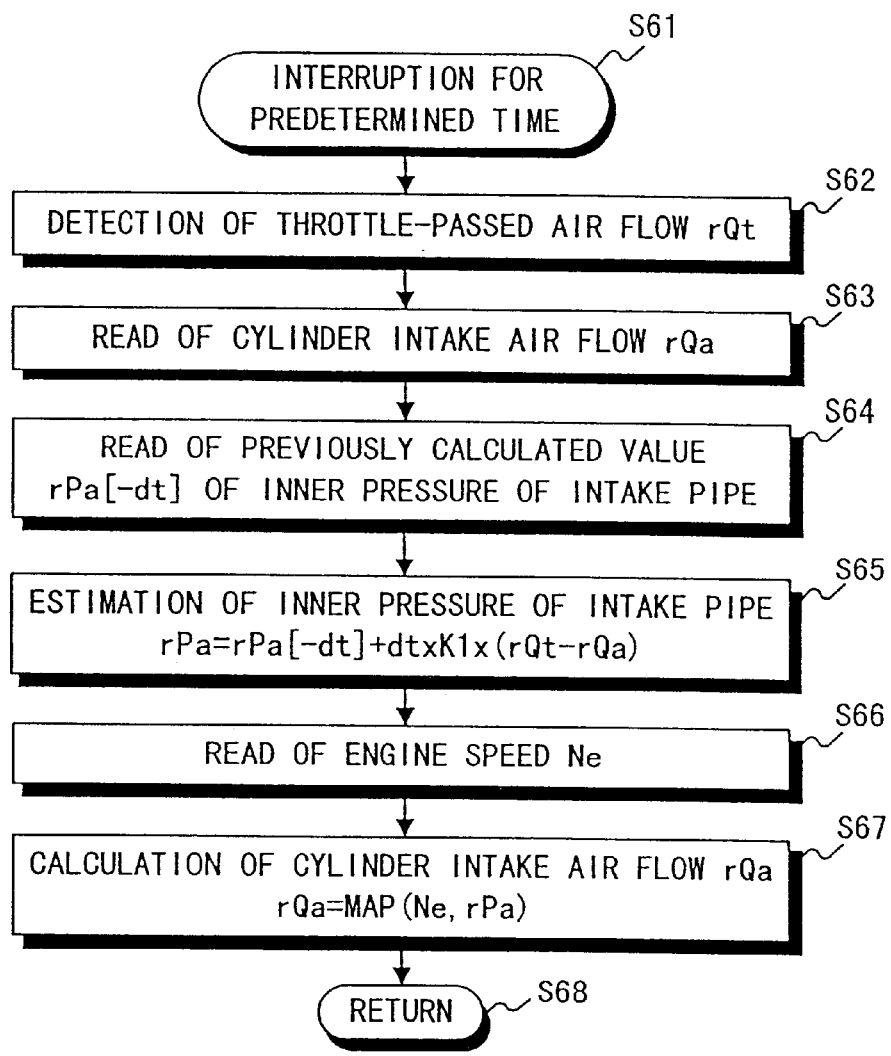
FIG. 6 is a flow chart of the intake air flow calculating means shown in FIG. 5.

The cylinder intake air flow rQa is calculated by the cylinder intake air flow calculating means 503 based on the engine speed Ne and the inner pressure rPa of the intake pipe calculated by the intake pipe inner pressure estimating means 502. A map used in the cylinder intake air flow calculating means 503 is set by the following equation (5). The equation (5) is introduced from the state equation of ideal gas.

$$rQa=\{rPa \times (Ne/120) \times M \times D/R \times Ta\}\eta \qquad (5)$$

where, D is the displacement of an engine and η is the charging efficiency. FIG. 6 is a flow chart of the intake air flow calculating means shown in FIG. 5.

Figure 7:
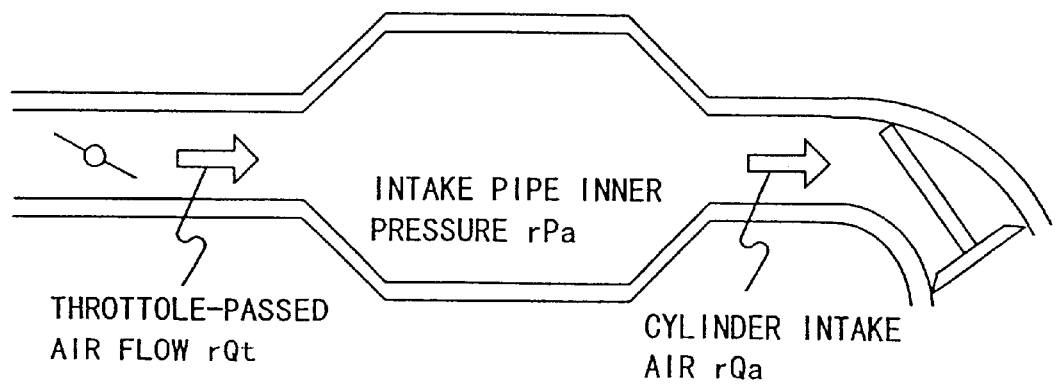
FIG. 7 is a model diagram of an intake pipe.

Effects of the control of FIG. 5 will be explained. FIG. 7 shows an example of a model of the intake pipe. Particularly, in a transient state, the throttle-passed air flow rQt does not match the cylinder intake air flow rQa due to the volume of the intake pipe. Concretely, the throttle-passed air flow rQt during the acceleration increases more than the cylinder intake air flow rQa, because extra air flow is required to fill up the intake pipe. Further, the throttle-passed air flow rQt during the deceleration decreases more than the cylinder intake air flow rQa, because a part of the air flow filled in the intake pipe flows into the cylinder.

While, it becomes possible to prevent the mismatching of the throttle-passed air flow rQt and the cylinder intake air flow rQa caused by the volume of the intake pipe by using the control of FIG. 5, because the time-variation of the inner pressure rPa of the intake pipe is modeled. As a result, it is possible to calculate the cylinder intake air flow rQa with a high accuracy.

Next, in the target air flow amount calculating means 104, the target air flow tQa is calculated by the equation (6) based on the reference pulse width KTP calculated in the reference pulse width calculating means 101, the target A/F ratio tAF calculated in the target A/F ratio calculating means 102 and the engine speed Ne.

$$tQa=(1/K2) \times KTP \times (tAF/14.7) \times Ne \qquad (6)$$

$$K2=Kn3 \times f(FP) \qquad (7)$$

Where, K2 is obtained by equation (7). K3 is a conversion coefficient used when the actual reference pulse rTP is obtained from the cylinder intake air flow rQa and the engine speed Ne of the equation (8) known in the control of the conventional intake port injection (MPI). Further, FP is a fuel pressure, and K2 includes the correction of the fuel pressure according to f(FP).

$$RTP=K3 \times (rQa/Ne) \qquad (8)$$

In the target throttle opening calculating means 105, the target throttle opening tTH is feedback-controlled according to the difference between the target air flow tQa calculated in the target air flow amount calculating means 104 and the cylinder intake air flow rQa calculated in the intake air flow calculating means 103. Where, an actuator for controlling the target throttle opening tTH is an electronically controlled throttle.

Figure 8:
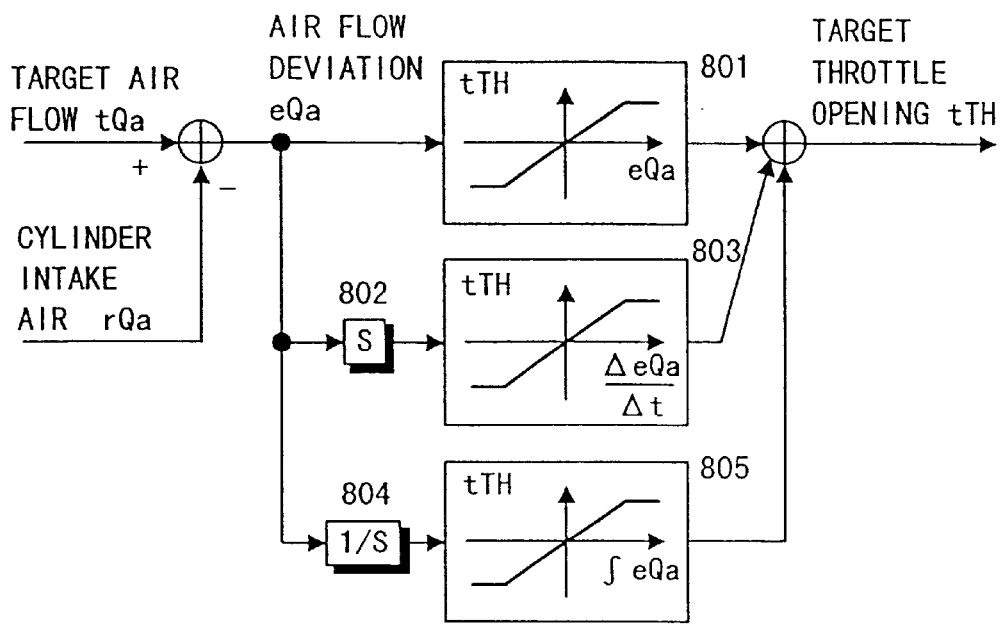
FIG. 8 is a control block diagram of the target throttle opening calculating means.
Figure 9:
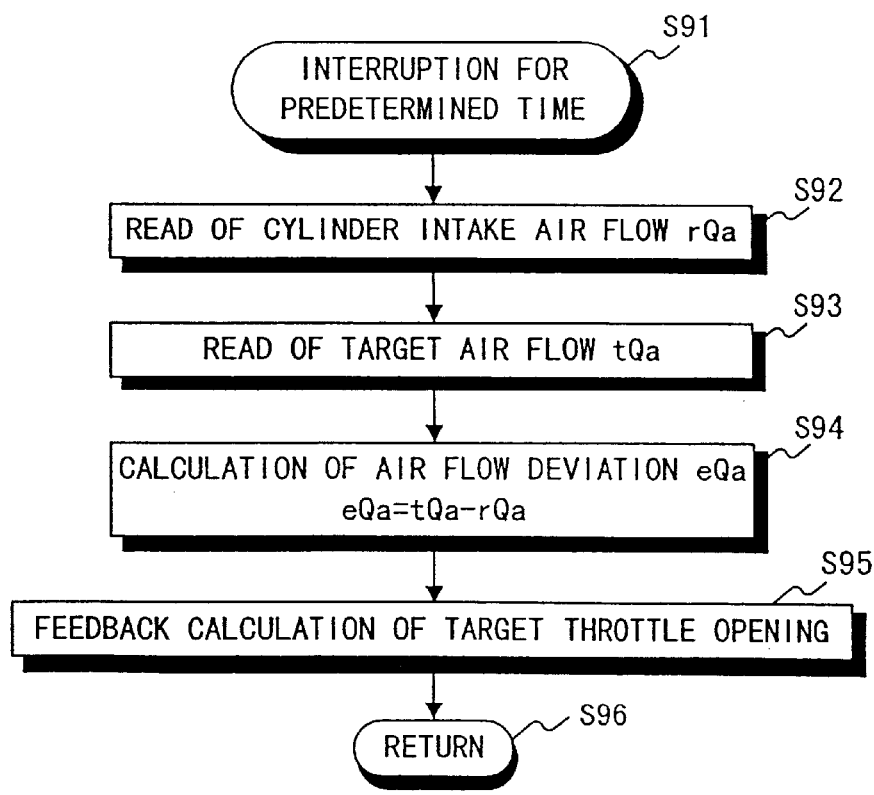
FIG. 9 is a flow chart of the target throttle opening calculating means shown in FIG. 8.

The configuration of the target throttle opening calculating means 105 is shown in FIG. 8. First, the deviation eQa of the air flow is obtained by subtracting the cylinder intake air flow rQa from the target air flow tQa. The proportional component of the feedback control is obtained by multiplying the deviation of the air flow by a gain obtained by a block 801, the differential component is obtained by multiplying the differential value of the air flow deviation eQa obtained by a differential circuit 802 by a differential gain in a block 803, and the integration component is obtained by multiplying the integral value of the air flow deviation eQa obtained by an integral circuit 804 by an integral gain in a block 805. Finally, the target throttle opening rTH is obtained by summing the proportional value, the differential value and the integral value. FIG. 9 shows a flow chart used for the calculation of the target throttle opening in FIG. 8

By performing the feedback control of the target throttle opening rTH, the matching steps are extremely decreased, and it becomes possible to fit correctly the cylinder intake air flow rQa to the target air flow tQa. Further, because the time-variation of the inner pressure is modeled and the mismatching of the throttle-passed air flow rQt, and thus the cylinder intake air flow rQa due to the volume of the intake pipe is compensated in this example, it is possible to obtain more accurate cylinder intake air flow rQa and thus improve the precision of the throttle control.

Figure 10:
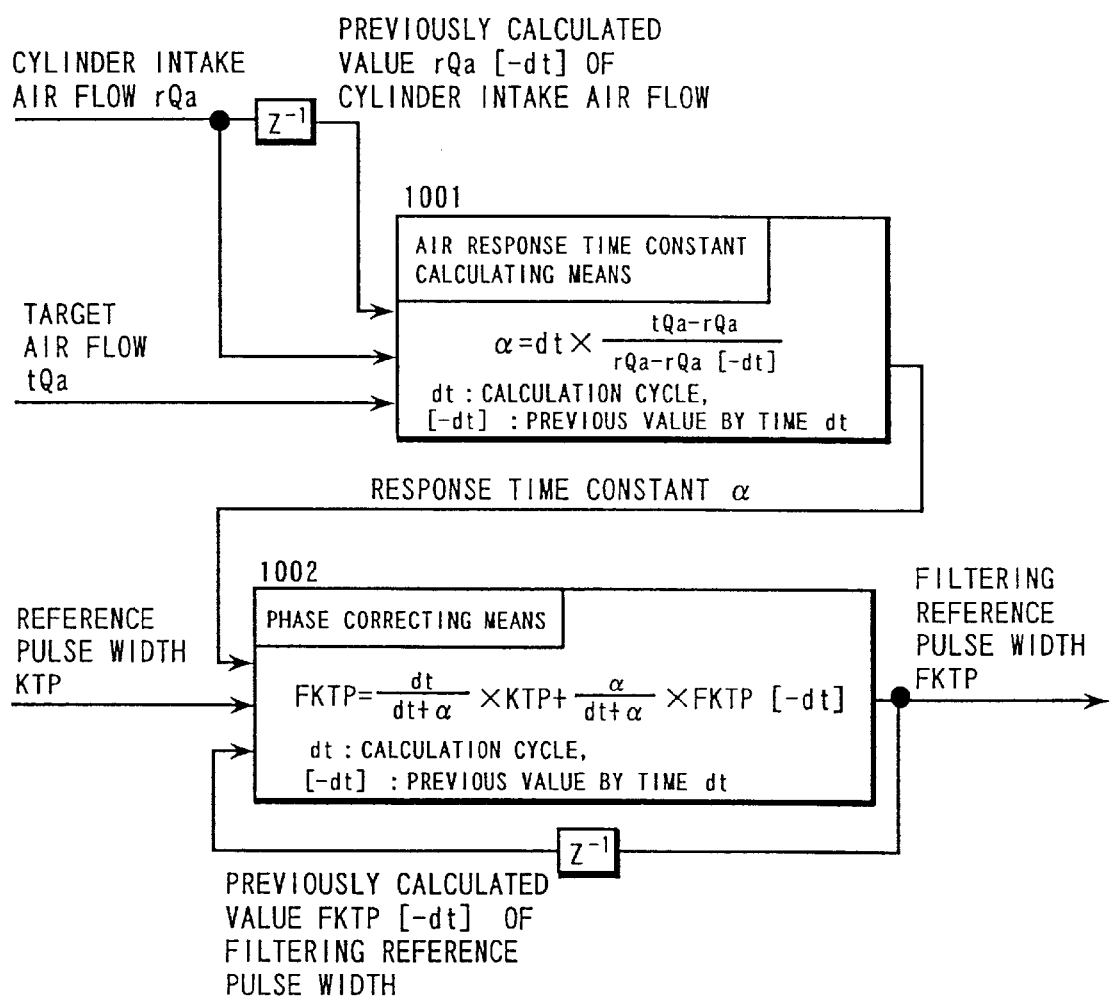
FIG. 10 is a control block diagram of the fuel injection phase correcting means.
Figure 11:
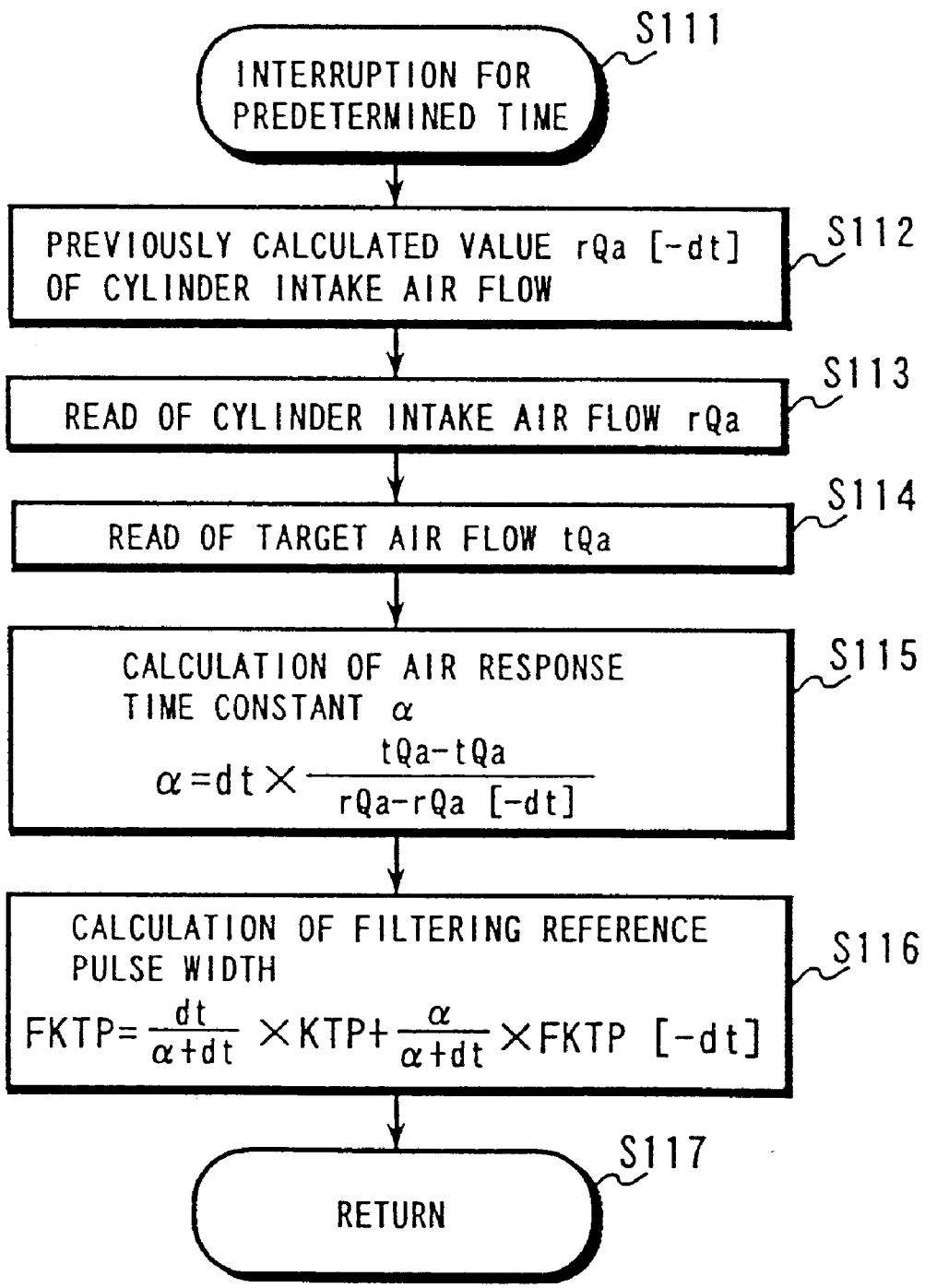
FIG. 11 is a flow chart of the fuel injection phase correcting means shown in FIG. 10.

Next, the configuration of the fuel injection phase correcting means 106 is shown in FIG. 10. the time constant a of air response of the cylinder intake air flow rQa is calculated by an air response time constant calculating means 1001 using equation (9), based on the cylinder intake air flow rQa calculated by the intake air flow calculating means 103 and the previously calculated value rQa[−dt] of the cylinder intake air flow and the target air flow tQa. Further, in a phase correcting means 1002, the filtering reference pulse width FKTP is calculated by equation (10) using the air-response time constant α as a time-filter. FIG. 11 shows a flow chart of the control of phase correction of the fuel injection in FIG. 10.

$$\alpha=dt \times \{(tQa-rQa)/(rQa-rQa[-dt])\} \qquad (9)$$

$$FKTP=\{dt/(\alpha+dt)\} \times KTP+\{\alpha/(\alpha+dt)\} \times FKTP[-dt] \qquad (10)$$

where, dt is the calculation cycle and [−dt] is the previous value by time dt.

Figure 12:
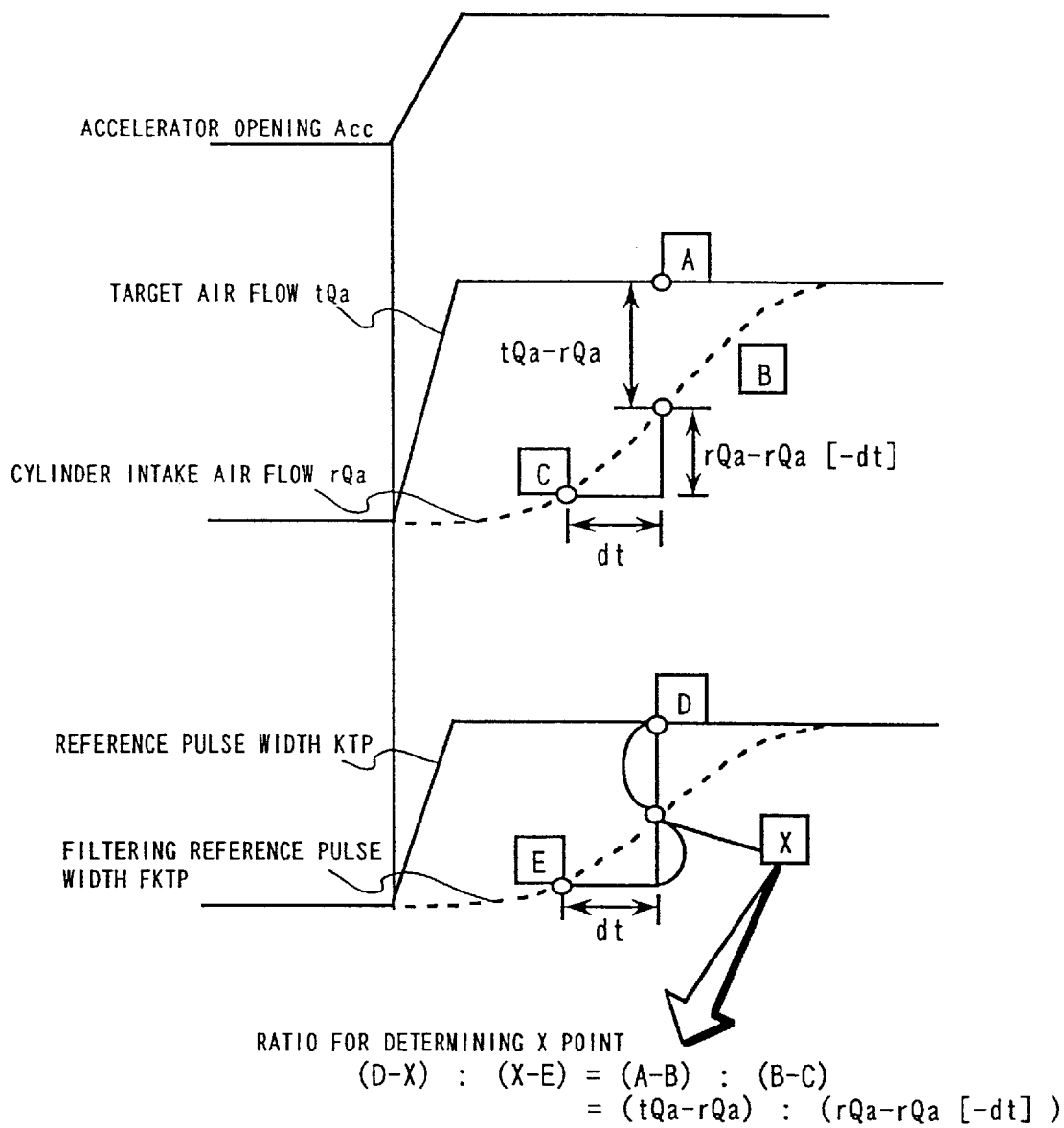
FIG. 12 is an illustration showing a method of calculating the time constant of air response.

The equations (9) and (10) will be explained by using FIG. 12. At a certain calculation timing, the ratio of the proportional distribution for determining a point B with respect to points A and C is calculated by using the target air flow tQa of the point A, the cylinder intake air flow rQa of the point B and the previously calculated value rQa [−dt] of the cylinder intake air flow of the point C. The reference pulse width KTP of a point D and the previously calculated value FKTP[−dt] of the filtering reference pulse width of a point E are proportionally distributed by using the ratio, and the filtering reference pulse width FKTP of a point X is obtained.

The width TI of the fuel injection pulse to be finally injected is different from the reference pulse width KTP by the equation (1). It is calculated based on the filtering reference pulse width FKTP calculated by the following equation (11). As a result, the fuel injection can be performed so as to match the phase of the cylinder intake air flow rQa.

$$TI=FKTP \times COEF \times GAMMA \qquad (11)$$

Figure 13:
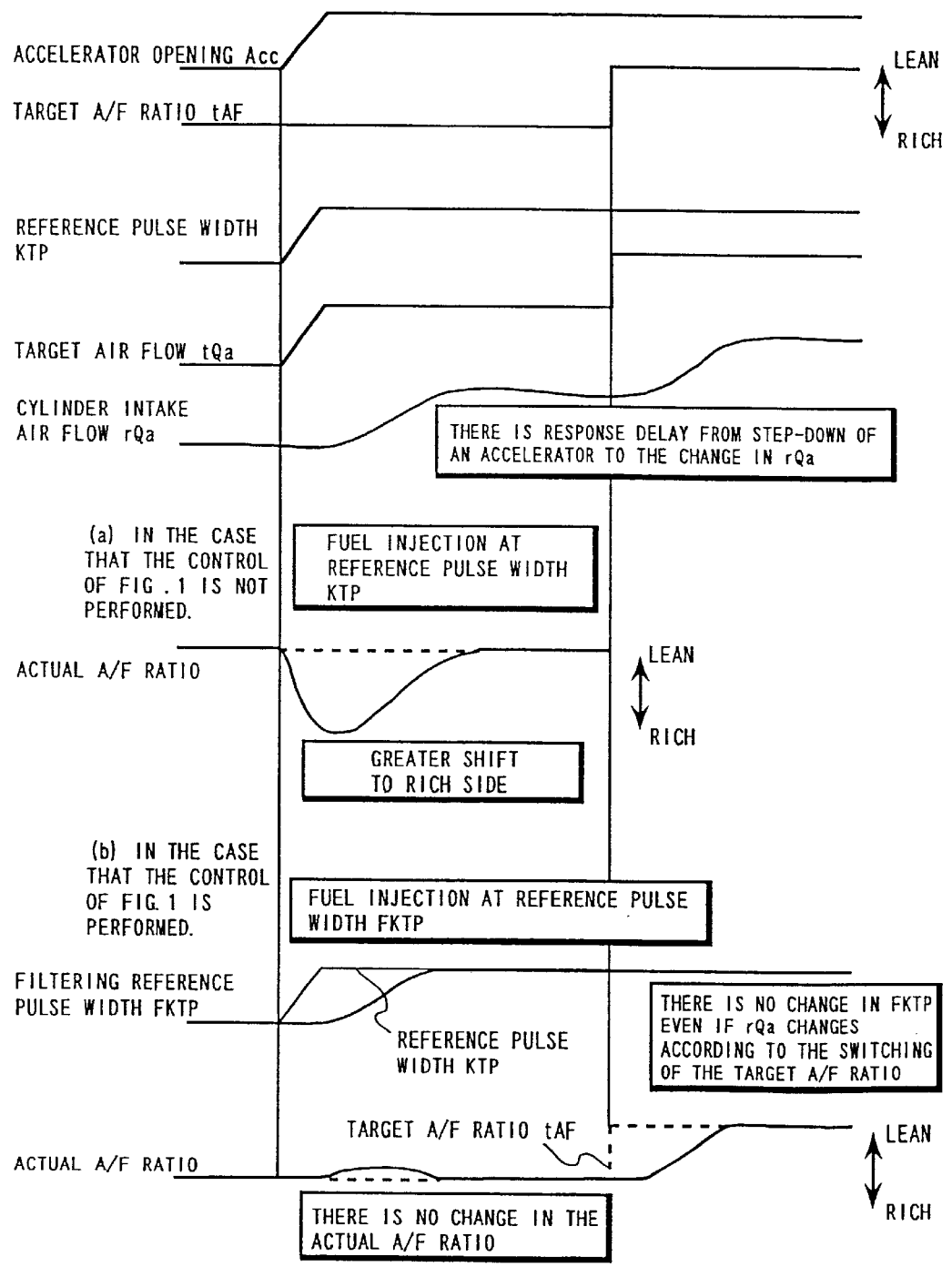
FIG. 13 is an illustration of effects of the fuel injection phase correcting means shown in FIG. 1.

FIG. 13 shows effects of the control in FIG. 1. Now assumed that an accelerator is opened in the in-cylinder injection engine which controls the intake air flow based on the torque or the fuel injection amount. FIG. 13(a) shows effects of the case where the control of FIG. 1 is not performed. In this case, the fuel injection amount is calculated based on the reference pulse width KTP in which the phase correction has not been performed, using the equation (1). While the variation of the fuel injection amount according to the variation of the reference pulse width KTP instantaneously occurs, the variation of the cylinder intake air flow rQa according to the variation of the target air flow tQa is behind the variation of the fuel injection amount due to the time-lag required to pass through the intake pipe or the time-lag required to vary the inner pressure of the intake pipe.

As a result, the region is produced where the phases of the fuel injection and the intake air flow do not match to each other. Therefor, the A/F ratio becomes rich, and thus the drive feeling deteriorates. At worst, the engine goes to stop. Next, FIG. 13(b) shows effects of the case where the control of FIG. 1 is performed. In the control of FIG. 1, the cylinder intake air flow rQa is calculated with high accuracy, and the air response time constant a is calculated from the time-variation of the cylinder intake air flow rQa. Then, the filtering reference pulse width FKTP is calculated by correcting the phase of fuel injection based on the air response time constant $\alpha$. In this case, the fuel injection amount is calculated based on the filtering reference pulse width FKTP of which the phase is corrected by equation (11). Thereby it becomes possible to fit accurately the phases of the fuel injection and the air intake to each other, and to control the A/F ratio to be constant even in the transient state of operation. It is possible to suppress the deterioration of the driving feel or exhaust by controlling the A/F ratio to be constant.

FIG. 13(b) shows also the variation of the filtering reference pulse width FKTP when the target A/F ratio is switched. In the correction of the fuel injection phase based on the equation (10), the filtering reference pulse width FKTP is not varied if the reference pulse width KTP is not varied. Therefore, the filtering reference pulse width FKTP is not varied even if the target A/F ratio tAF is switched and the cylinder intake air flow rQa is increased. In other words, it becomes possible to eliminate the variation of the fuel injection amount due to the switching of the target A/F ratio tAF, that is, the occurrence of the torque shock.

Hereinafter, alternative of the configuration of FIG. 1 will be explained every block shown in FIG. 4.

Figure 14:
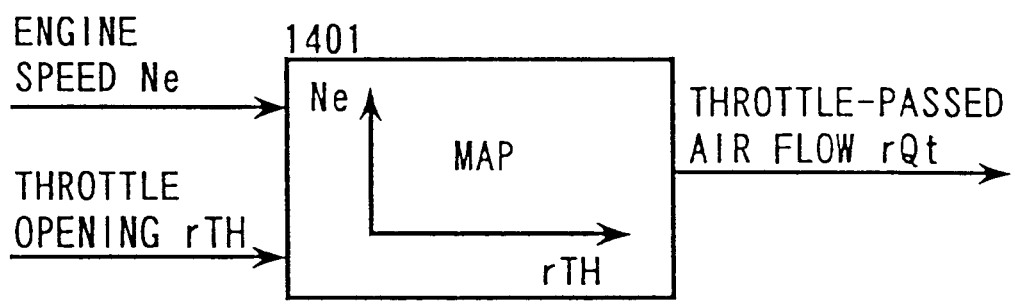
FIG. 14 is a control block diagram of the throttle-passed air flow calculating means.
Figure 15:
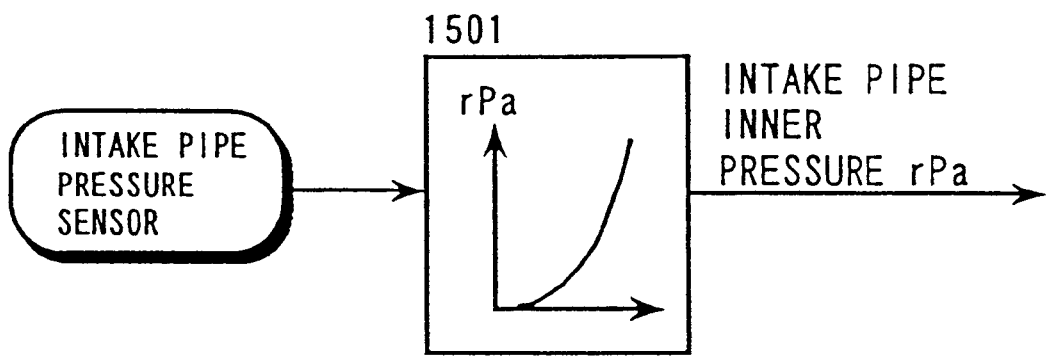
FIG. 15 is a control block diagram of the intake pipe inner pressure estimating means.
Figure 16:
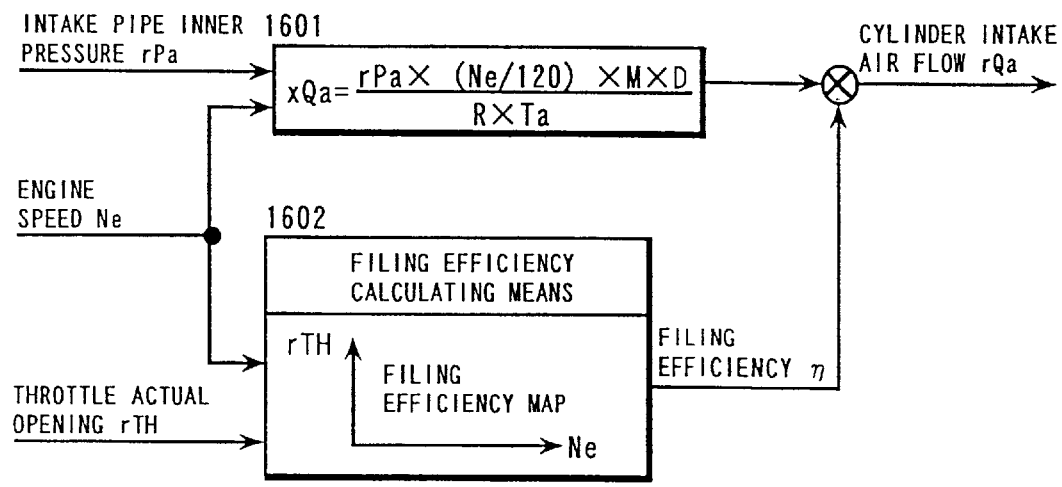
FIG. 16 is a control block diagram of the cylinder intake air flow calculating means.

With regard to the intake air flow calculating means 403, it should be appreciated that the throttle-passed air flow rQt can be obtained not only by the air flow sensor as shown in FIG. 5, but by referring a map with the axes of the engine speed Ne and the throttle opening rTH as shown in FIG. 14. Instead of the intake pipe inner pressure estimating means 502 of FIG. 5, an intake pipe pressure sensor may provided as shown in FIG. 15, in which the value detected by the intake pipe pressure sensor is input to the cylinder intake air flow calculating means 503 as the intake pipe inner pressure rPa. Further, instead of the cylinder intake air flow calculating means 503, the cylinder intake air flow rQa may be obtained in the way shown in FIG. 16. the value rQa is calculated by the equation eliminated the charging efficiency $\eta$ from the equation of FIG. 5 in a block 1601. The charging efficiency $\eta$ is obtained by referring a map with the axes of the engine speed Ne and the actual opening rTH of the throttle in a charging efficiency calculating means 1602 arranged in parallel with the block 1601. Furthermore, the charging efficiency $\eta$ may be modeled and the cylinder intake air flow calculating means 503 may be substituted for a linear equation.

In the intake air flow calculating means 403, the throttle-passed air flow rQt itself may be used as the cylinder intake air flow rQa without using the control of FIG. 5. It may be possible to use as the cylinder intake air flow rQa by filtering the throttle-passed air flow rQt with the time constant $\beta$ as shown in equation (12).

$$rQa=\{dt/(\beta+dt)\}\times rQt+\{\beta/(\beta+dt)\}\times rQa[-dt] \qquad (12)$$

where, dt is the calculation cycle and [−dt] is the previous value by time dt.

Figure 17:
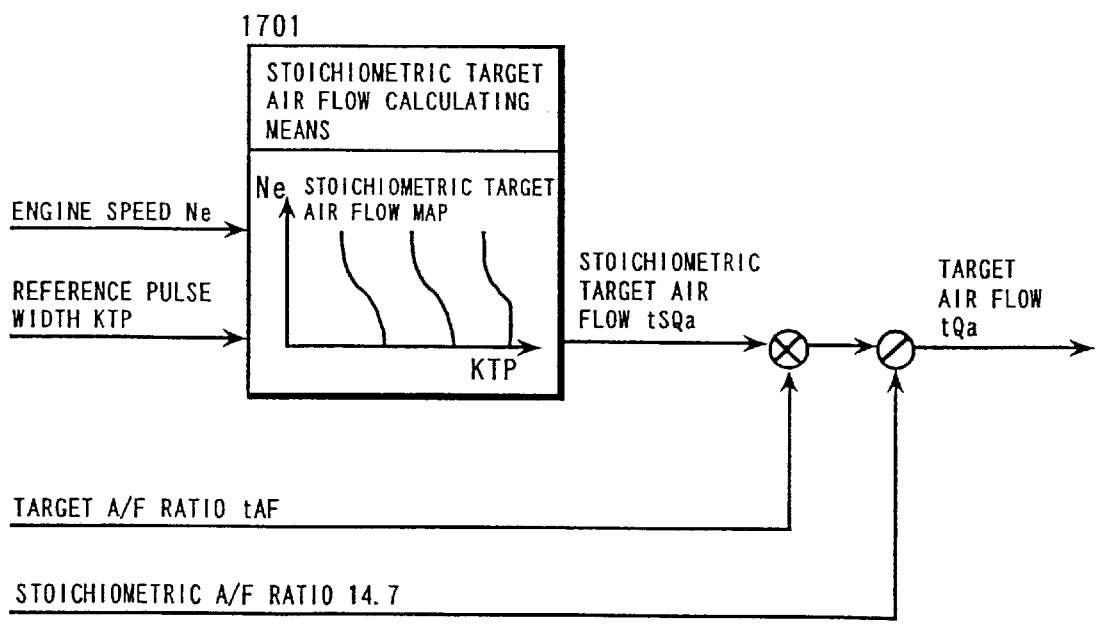
FIG. 17 is a control block diagram of the target air flow amount calculating means.
Figure 18:
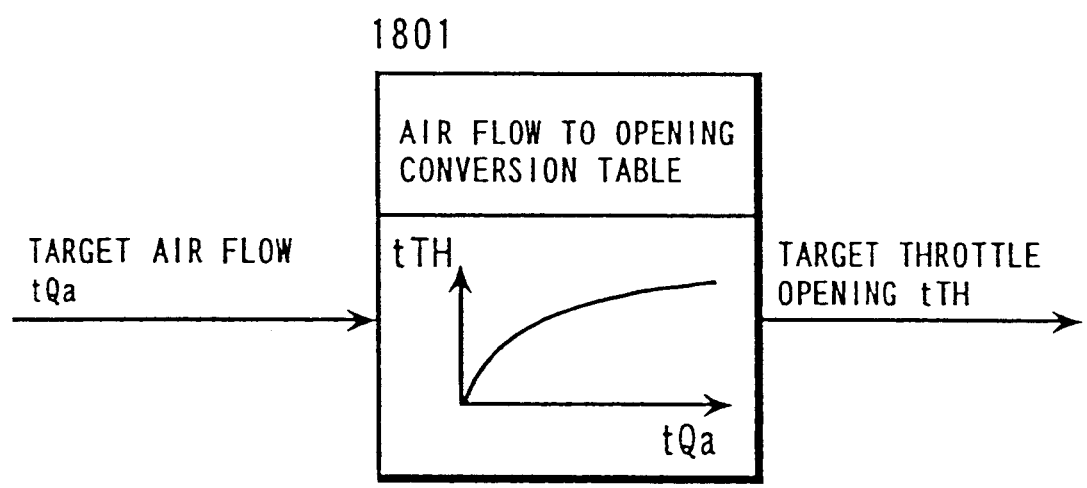
FIG. 18 is a control block diagram of the target throttle opening calculating means.

Next, as to the target air flow amount calculating means 404, in addition to calculate the target air flow tQa according to the linear equation (6), it may be possible to calculate the target air flow tQa according to the linear equation in which the reference pulse width KTP is substituted for the fuel injection pulse TI. Further, the target air flow tQa may be obtained in such a method that as shown in FIG. 17 the stoichiometric target air flow tSQa is calculated by referring a map with the axes of the engine speed Ne and the reference pulse width KTP in a stoichiometric target air flow calculating means 1701, the stoichiometric target air flow tSQa is multiplied by the target A/F ratio tAF, and its product is divided by the stoichiometric A/F ratio or 14.7.

Next, with respect to the target ttt 405, in addition to feedback-calculate the target throttle opening tTH based on the deviation eQa of the air flow, i.e. the difference between the target air flow tQa and the cylinder intake air flow rQa as shown in FIG. 8, it may be possible to use such a method that the target air flow tQa calculated in the target air flow amount calculating means 404 is converted into the target throttle opening tTH according to the air flow to opening conversion table 1801.

Two other examples of the target ttt 405 will be explained hereinafter.

Figure 19:
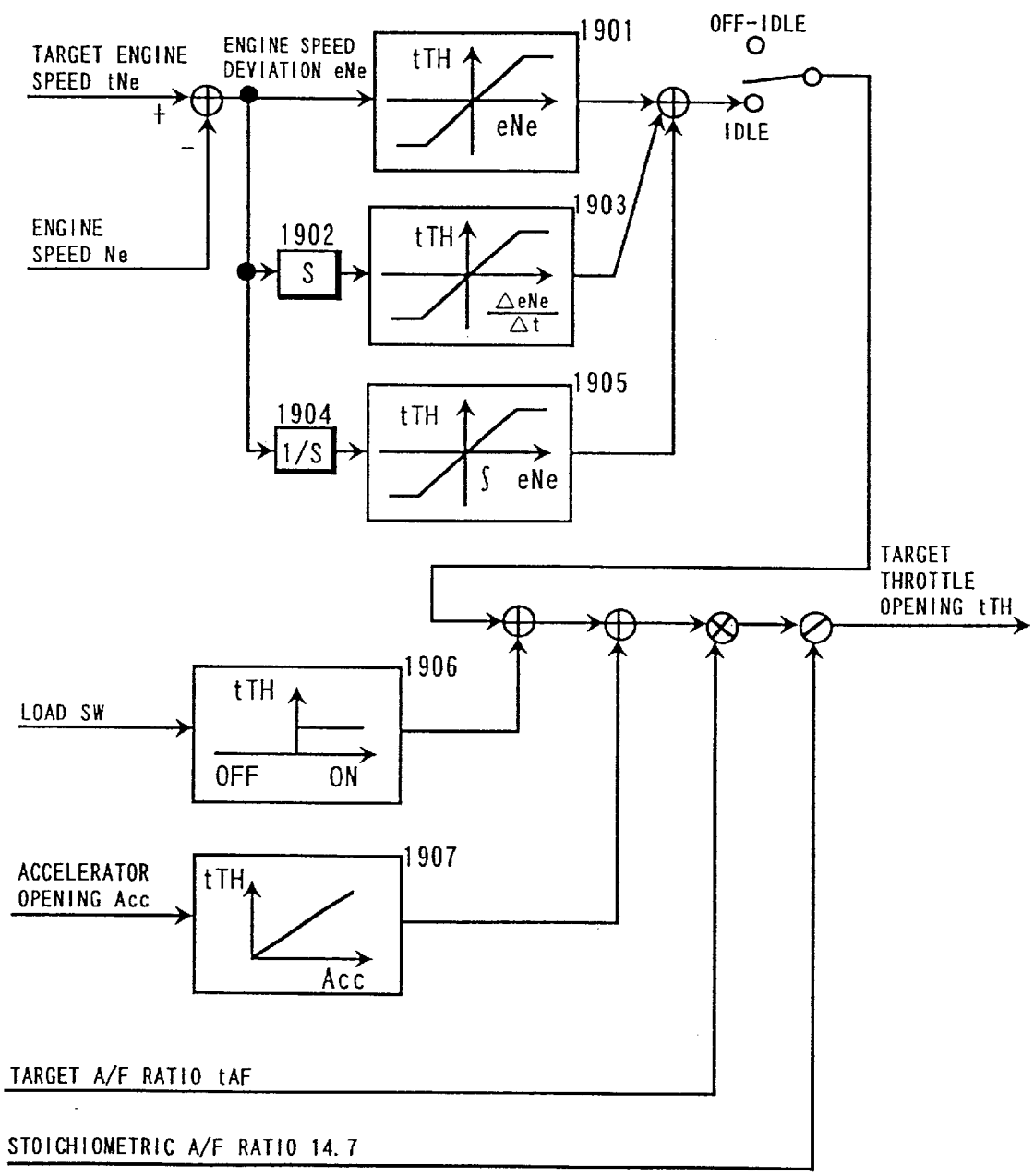
FIG. 19 is a control block diagram of the target throttle opening calculating means.
Figure 20:
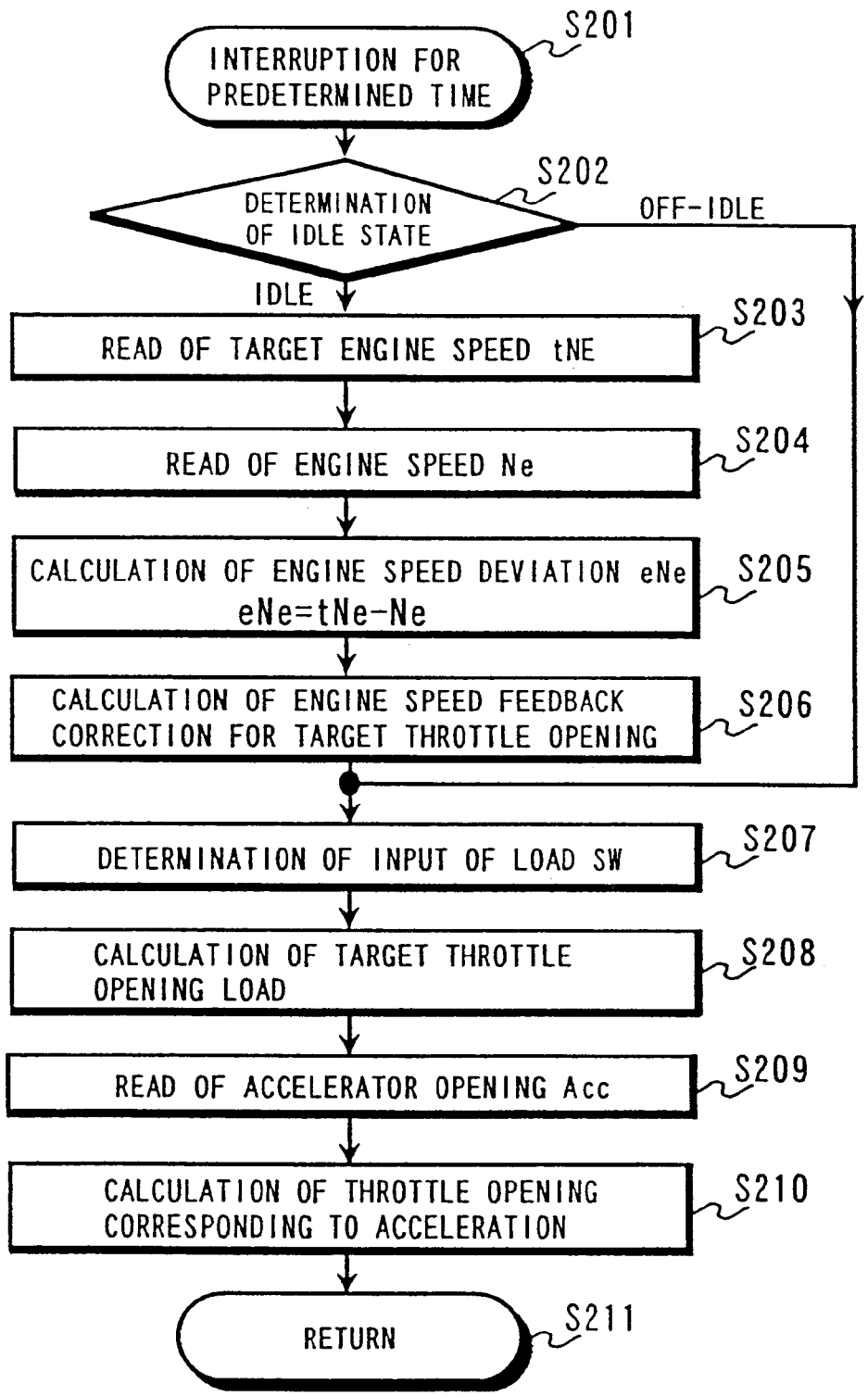
FIG. 20 is a flow chart of the target shown in FIG. 19.

One example is shown in FIG. 19. The throttle opening corresponding to engine speed feedback correction for allowing the engine speed at idle to follow the target engine speed is firstly calculated in the control of FIG. 19. The deviation eNe between the target engine speed tNe and the engine speed Ne is obtained. The proportional component of a PID control is obtained by multiplying the deviation eNe by a gain obtained by a block 1901, the differential component is obtained by multiplying the differential value of the deviation eNe obtained by a differential circuit 1902 by a differential gain in a block 1903, and the integration component is obtained by multiplying the integral value of the deviation eNe obtained by an integral circuit 1904 by an integral gain in a block 805. Finally, the throttle opening corresponding to the feedback correction of the engine speed is obtained by summing the proportional value, the differential value and the integral value. Further, in a block 1906, the load-corresponding throttle opening is obtained based on the load SW corresponding to an on/off state of an air conditioner, a power steering, an electrical load (consumption current), an electrical radiator fan, etc. Further, in a block 1907, the throttle opening corresponding to the accelerator is calculated based on the opening Acc of the accelerator. The target throttle opening tTH is obtained by adding the throttle opening corresponding to the engine speed feedback, the throttle opening corresponding to the loads and the throttle opening corresponding to the accelerator, multiplying the sum by the target A/F ratio tAF and dividing the product by the stoichiometric A/F ratio (=14.7). FIG. 20 shows a flow chart for calculating the target throttle opening tTH of FIG. 19.

Figure 21:
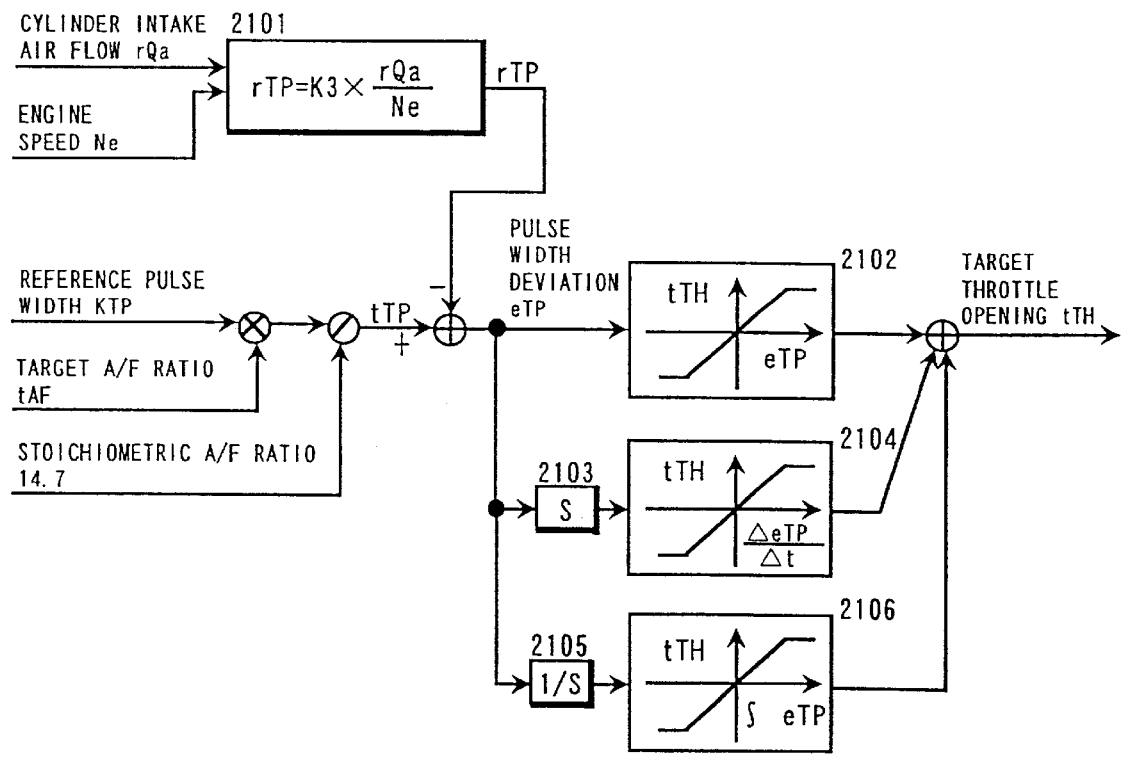
FIG. 21 is a control block diagram of the target throttle opening calculating means.

The other control is shown in FIG. 21. in a block 2101, the actual reference pulse width rTP is calculated by the equation (8) based on the engine speed Ne and the cylinder intake air flow rQa obtained in the intake air flow calculating means 403. While, the target reference pulse width tTP is calculated by the following equation (13) based on the reference pulse width KTP, the target A/F ratio tAF and the stoichiometric A/F ratio.

$$tTP = KTP \times (tAF/14.7) \quad (13)$$

Figure 22:
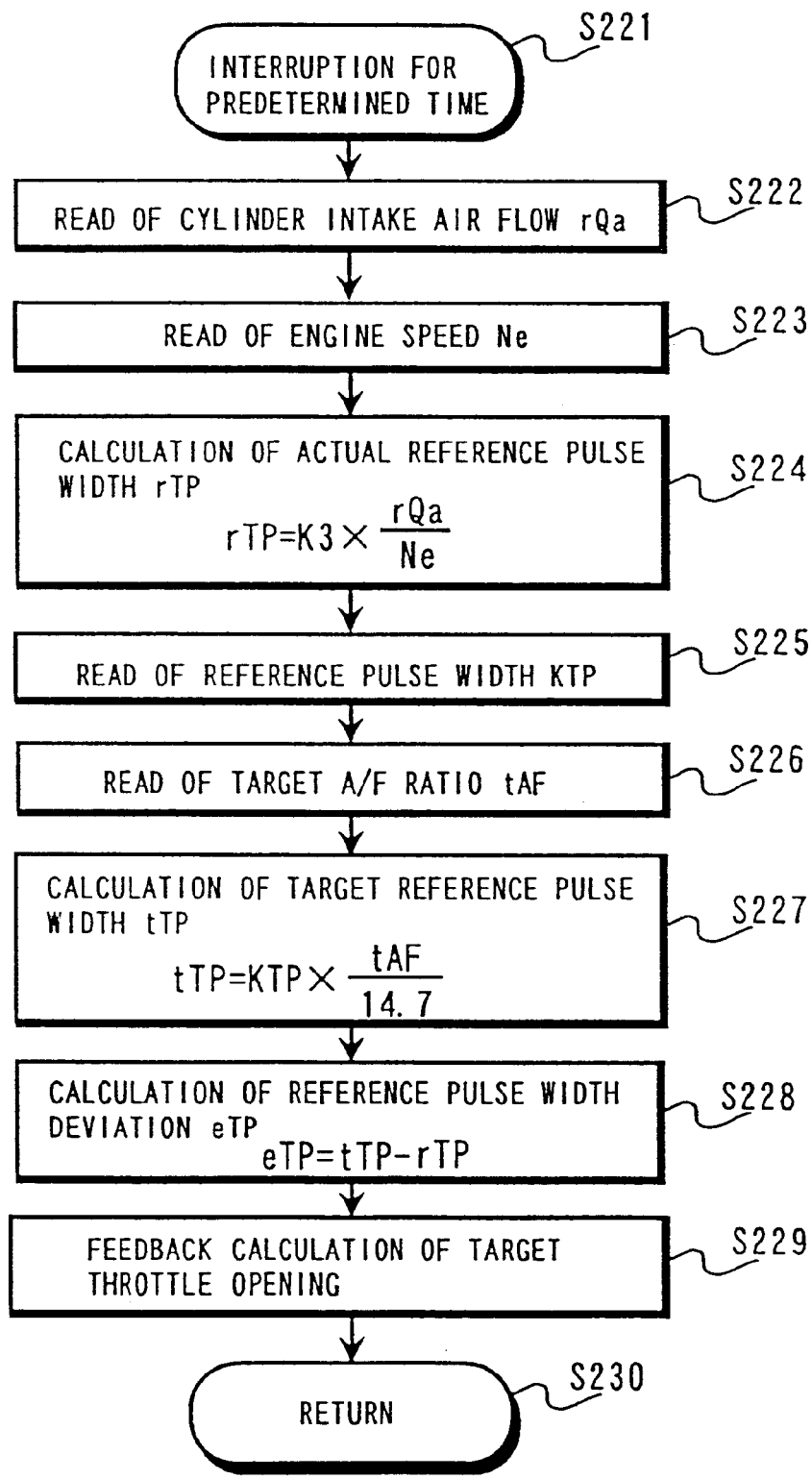
FIG. 22 is a flow chart of the target throttle opening calculating means shown in FIG. 21.

Then, the deviation eTP between the target reference pulse width tTP and the actual reference pulse width rTP is obtained. The proportional component of a PID control is obtained by multiplying the deviation eTP by a gain obtained by a block 2102, the differential component is obtained by multiplying the differential value of the deviation eTP obtained by a differential circuit 2103 by a differential gain in a block 2104, and the integration component is obtained by multiplying the integral value of the deviation eTP obtained by an integral circuit 2105 by an integral gain in a block 2106. Finally, the target throttle opening tTH is obtained by summing the proportional value, the differential value and the integral value. FIG. 22 shows a flow chart for calculating the target throttle opening of FIG. 21.

The actuator for obtaining the target throttle opening tTH calaculated by the target throttle opening calculating means 405 may be an electronically controlled throttle.

Three examples of the fuel injection phase correcting means 406 will be explained hereinafter.

Figure 23:
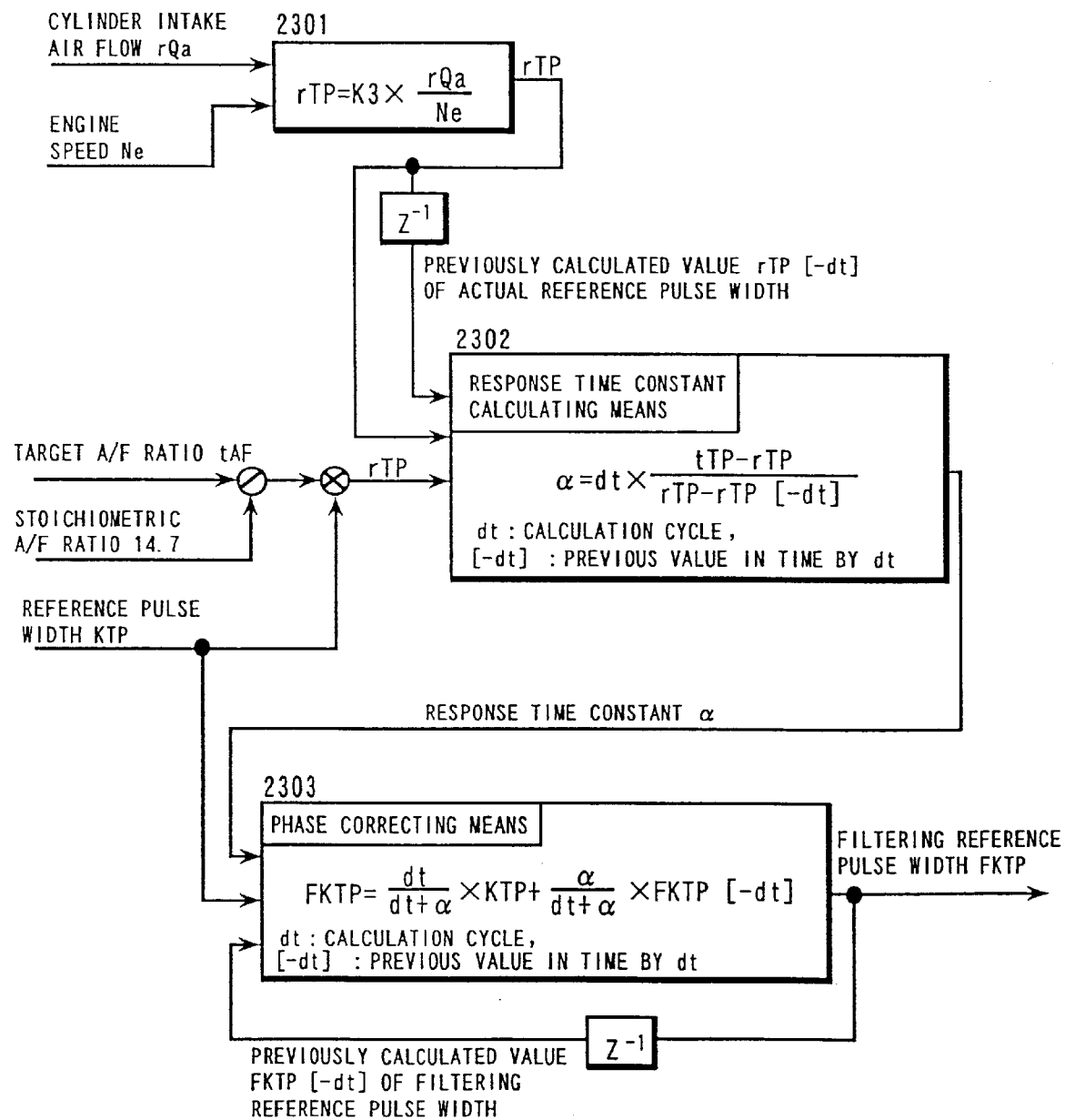
FIG. 23 is a control block diagram of the fuel injection phase correcting means.

A first example of the control is shown in FIG. 23. in a block 2301, the actual reference pulse width rTP is calculated by the equation (8) based on the engine speed Ne and the cylinder intake air flow rQa. While, the target reference pulse width tTP is obtained by multiplying the reference pulse width KTP by the target A/F ratio tAF and dividing the product by the stoichiometric A/F ratio (=14.7). the response time constant β of the actual reference pulse width rTP is calculated by the following equation (14) based on the actual reference pulse width rTP, the previously calculated value rTP[−dt] of the actual reference pulse width and the target reference pulse width tTP in a response time constant calculating means 2302.

$$\alpha = dt \times \{(tTP - rTP)/(rTP - rTP[-dt])\} \quad (14)$$

where, dt is the calculation cycle and [−dt] is the previous value by time dt.

Figure 24:
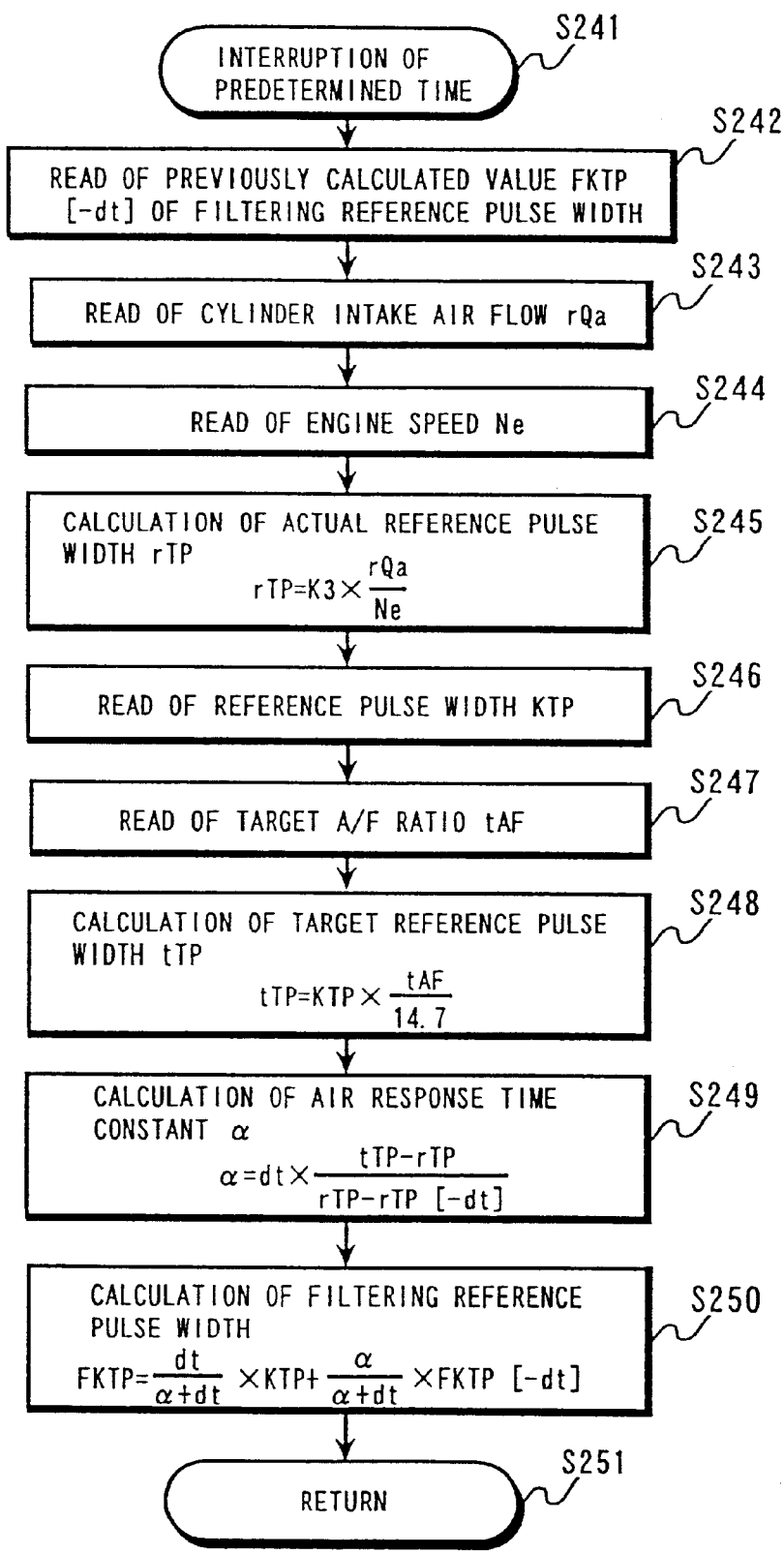
FIG. 24 is a flow chart of the fuel injection phase correcting means shown in FIG. 22.

Then, in a phase correcting means 2303, the filtering reference pulse width FKTP is calculated by equation (10) using the air-response time constant a as a time-filter. FIG. 24 shows a flow chart of the control of phase correction of the fuel injection in FIG. 23.

A second example of the control is a method of using the ratio of the target air flow tQa to the cylinder intake air flow rQa as a time-filter. Concretely, the ratio of of the target air flow tQa calculated by the target air flow amount calculating means 104 to the cylinder intake air flow rQa calculated by the intake air flow calculating means is calculated by the following equation (15), and the filtering reference pulse width FKTP is obtained by multiplying the ratio by the reference pulse width KTP calculated by the reference pulse width calculating means 101.

$$FKTP = KTP \times (rQa/tQa) \quad (15)$$

The ratio of the target air flow tQa to the cylinder intake air flow rQa is a correction term corresponding to time-variation of the cylinder intake air flow rQa to the target air flow tQa and becomes a time-filter with respect to the reference pulse width KTP. Because the correction term is provided, it is possible to fit the filtering reference pulse width FKTP to the phase of the cylinder intake air flow rQa.

Figure 25:
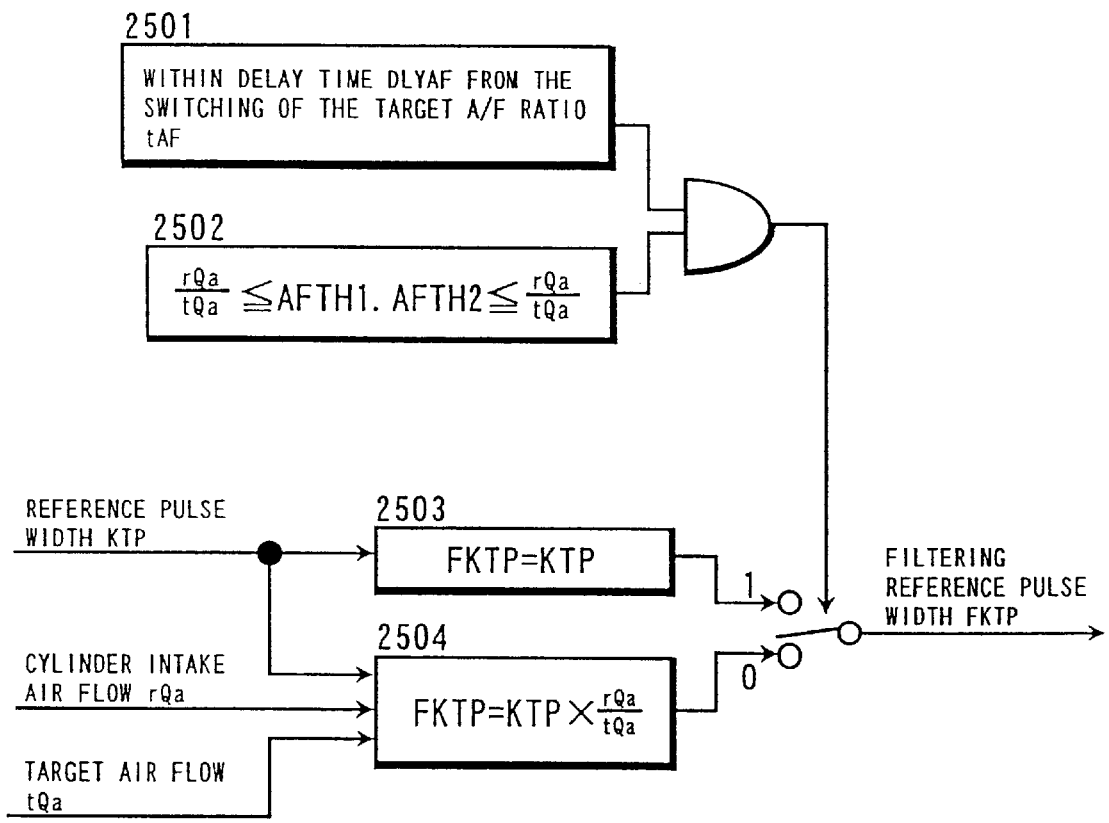
FIG. 25 is a control block diagram of the fuel injection phase correcting means.

Further, in a method in which the ratio of the cylinder intake air flow rQa and the target air flow tQa is used as a time-filter according to the equation (15), it may be possible to use the reference pulse width KTP itself as the filtering reference pulse width FKTP under the predetermined condition. FIG. 25 shows a block diagram including the predetermined condition.

If a first condition 2501 is satisfied that it is within a predetermined delay time from the switching of the target A/F ratio, and if a second condition 2502 is also satisfied that the ratio of the cylinder intake air flow and the target air flow is within a range defined by a certain threshold value, the reference pulse width itself can be used as the filtering reference pulse width in a block 2503. While, if either the conditions 2501 or 2502 is not satisfied, the filtering reference pulse width FKTP is obtained by multiplying the reference pulse width KTP by the ratio of the cylinder intake air flow rQa and the target air flow tQa. Where, AFTH1 and AFTH2 are set to, for example, 95% and 105%, respectively.

Figure 26:
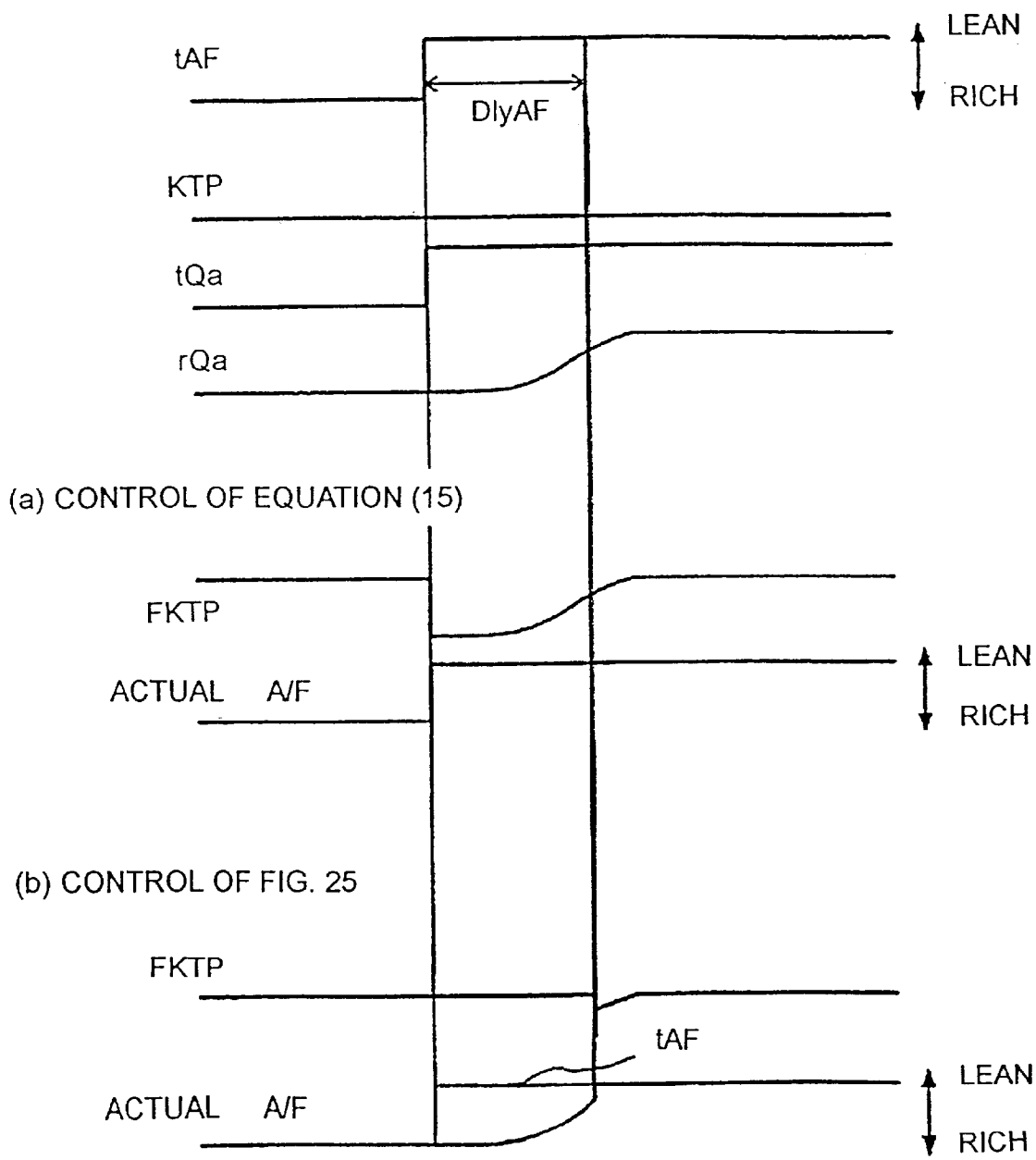
FIG. 26 is an illustration of effects of the fuel injection phase correcting means shown in FIG. 25.

FIG. 26 shows effects of the control shown in FIG. 25. Now with regard to the variation of each variable before and after the switching of the target A/F ratio tAF, the reference pulse width KTP is not varied, but the target air flow tQa is varied according to the switching of the target A/F ratio. The cylinder intake air flow rQa is also varied so as to follow the target air flow tQa. At this time, the variation of the filtering reference pulse width FKTP before and after the switching of the target A/F ratio tAF is decreased due to the effect of the ratio of the cylinder intake air flow rQa and the target air flow tQa if the control of the equation (15) is performed as illustrated in FIG. 26(a). Therefore, the amount of fuel injection is decreased before and after the switching of the target A/F ratio tAF, and thus the torque shock is occurred. While, because both the first and second conditions 2501, 2502 are satisfied before and after the switching of the target A/F ratio tAF if the control of FIG. 25 is performed as illustrated in FIG. 26(a), the filtering reference pulse width FKTP becomes equal to the reference pulse width KTP, and thus it is not varied before and after the switching of the target A/F ratio tAF. Therefore, the amount of fuel injection becomes constant before and after the switching of the target A/F ratio tAF, and thus the torque shock is not occurred.

In the final example, the constant is set to as a time-filter. Concretely, the filtering reference pulse width FKTP is obtained by delaying the reference pulse width KTP by the delay time Dly. Alternatively, the filtering reference pulse width FKTP is obtained from the reference pulse width KTP based on a time constant γ of first-order lag.

$$FKTP = KTP[-Dly] \quad (16)$$

$$FKTP = (dt/n(\gamma+dt)) \times KTP + (\gamma/(\gamma+dt)) \times FKTP[-dt] \quad (17)$$

where, dt is the calculation cycle and [−dt] is the previous value by time dt.

Further, the following methods can be adopted as a method of setting the delay time Dly and the time constant γ of first-order lag.

In one method, the delay time and the time constant of first-order lag are switched to either of two setting values, in accordance with either an idle state or an off-idle state, the accelerator opening Acc, the actual opening rTH of the throttle, and the cylinder intake air flow rQa.

In another method, the delay time and the time constant of first-order lag are obtained by referring to a table with an axis of a gear position, an engine speed Ne, actual opening rTH of the throttle, or a cylinder intake air flow rQa.

In a further method, the delay time and the time constant of first-order lag are obtained by referring to a map having axes of an engine speed Ne and actual opening rTH of the throttle, or a map with axes of an engine speed Ne and a cylinder intake air flow rQa.

Further, the value of the time-filter in the fuel injection phase correcting means 406 may be obtained by learning based on the operating condition. As a learning method of the time-filter, the following methods are used.

In one method, the delay time Dly is obtained by learning the time from the change in the target throttle opening rTH to the change in a cylinder intake air flow rQa.

In another method, the constant time γ of first-order lag is obtained by learning the change in a cylinder intake air flow rQa when the target throttle opening rTH is changed.

Further, the following methods can be adopted as a method of setting the delay time Dly and the time constant γ of first-order lag.

In one method, the delay time and the time constant of first-order lag is obtained by learning as two setting values, in accordance with either an idle state or an off-idle state, the accelerator opening Acc, the actual opening rTH of the throttle, and the cylinder intake air flow rQa.

In another method, the delay time and the time constant of first-order lag is obtained by learning as a reference value of a table with an axes of the gear position, the engine speed Ne, the actual opening rTH of the throttle, or a cylinder intake air flow rQa.

In a further method, the delay time and the time constant of first-order lag are obtained by learning as a reference value of a map with axes of an engine speed Ne and actual opening rTH of the throttle, or they are obtained by using a map with axes of an engine speed Ne and a cylinder intake air flow rQa.

To sum up the above description, there is a key point in that the phases of the fuel injection and the air intake are fitted to each other by delaying the response of the fuel injection in the fuel injection phase correcting means 406. While, in the case that the target throttle opening tTH is obtained by using the feedback control shown in FIGS. 8 or 21 in the target throttle opening calculating means 403, the response of the air intake is speeded up, and thus the phases of the fuel injection and the air intake are fitted to each other.

Concretely, a means for setting the feedback constant of the target throttle opening feedback calculating means in accordance with the operating condition is provided in the target throttle opening feedback calculating means shown in FIGS. 8 or 21.

The following apparatus are used as the means for setting the feedback constant.

In one apparatus, the feedback constant setting means switches the feedback constant to either of two setting values, in accordance with either an idle state or an off-idle state, the accelerator opening Acc, the actual opening rTH of the throttle, and the cylinder intake air flow rQa.

In another apparatus, the feedback constant setting means obtains the feedback constant by referring to a table with an axis of the gear position, the engine speed Ne, the actual opening rTH of the throttle, or the cylinder intake air flow rQa.

In a further apparatus, the feedback constant setting means obtains the feedback constant by referring to a map with axes of the engine speed Ne and the actual opening rTH of the throttle, or a map with axes of the engine speed Ne and the cylinder intake air flow rQa.

Figure 27:
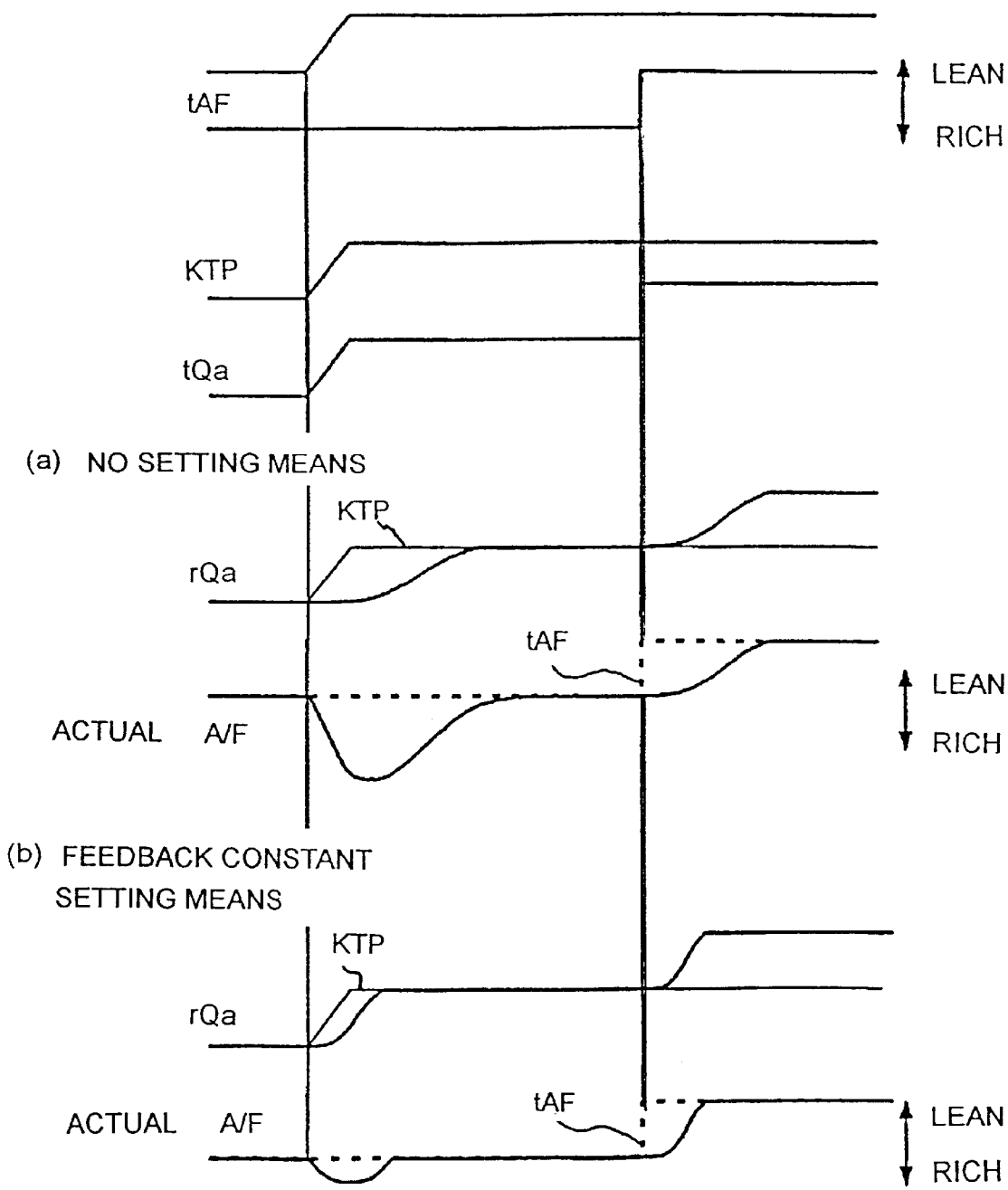
FIG. 27 is an illustration of effects of a means for setting the feedback constant of the target throttle opening.

FIG. 27 shows effects of the feedback constant setting means for setting the feedback constant according to the operating conditions. In the case that there is no feedback constant setting means as shown in FIG. 27(*a*), the variation of the cylinder intake air flow rQa is delayed and thus the variation of the A/F ratio is occurred because the feedback constant for the steady state is used even in the transient state. In addition, the convergence from the actual A/F ratio to the target A/F ratio is delayed when the target A/F is switched. While, in the case that there ifeedback constant setting meanss as shown in FIG. 27(*b*), the variation of the cylinder intake air flow rQa is speeded up and thus the A/F ratio is controlled so as to be constant because the feedback constant for the transient state is larger than that in the steady state. In addition, the convergence from the actual A/F ratio to the target A/F ratio is delayed when the target A/F is switched. By controlling the A/F ratio so as to be constant, it becomes possible to suppress the deterioration of the dive feeling and exhaust. In addition, the convergence from the actual A/F ratio to the target A/F ratio is speeded up when the target A/F is switched.

While the described embodiment represents the preferred form of the present invention, it is to be understood that changes and variations may be made without departing from the spirit of the invention.

What is claimed is:

1. An engine control apparatus comprises;
    a reference pulse width calculating means for calculating the width of a reference pulse used as the reference when a fuel injection pulse width is calculated based on operating conditions,
    a target A/F ratio calculating means for calculating the target A/F ratio based on the operating conditions,
    a target throttle opening calculating means for calculating the target throttle opening based on the operating condition including the target A/F ratio,
    a fuel injection phase correcting means for calculating the width of a filtering reference pulse by time-filtering the reference pulse width,
    whereby the fuel injection amount is calculated based on the filtering reference pulse width and the fuel injection control is performed.

2. The engine control apparatus according to claim 1, further comprising an intake air flow calculating means for calculating air flow aspirated into an engine cylinder and obtaining actual air flow aspirated into the cylinder.

3. The engine control apparatus according to claim 2, wherein said intake air flow calculating means for calculating or detecting throttle-passed air flow, and calculating the air flow aspirated into the cylinder.

4. The engine control apparatus according to claim 2, wherein said intake air flow calculating means comprises;
    a throttle-passed air flow calculating means for calculating or detecting the throttle-passed air flow,
    an intake pipe inner pressure estimating means for estimating the inner pressure of the intake pipe based on the throttle-passed air flow and the cylinder intake air flow, and
    a cylinder intake air flow calculating means for calculating the cylinder intake air flow based on engine speed and the inner pressure of the intake pipe.

5. The engine control apparatus according to claim 2, wherein said intake air flow calculating means comprises;
    an intake pipe inner pressure detecting means for detecting the inner pressure of the intake pipe, and
    a cylinder intake air flow calculating means for calculating the air flow aspirated into the cylinder based on engine speed and the inner pressure of the intake pipe.

6. The engine control apparatus according to any one of claims 1 to 5, further comprising a target air flow calculating means for calculating the target air flow to be aspirated into the engine cylinder.

7. The engine control apparatus according to claim 6, wherein said target air flow calculating means calculates the target air flow based on the width of the reference pulse, the target A/F ratio and the engine speed.

8. The engine control apparatus according to claim 1, wherein the reference pulse width calculating means obtains the width of the reference pulse by referring to a map with axes of an engine speed and an accelerator opening.

9. The engine control apparatus according to claim 1, wherein the target A/F ratio calculating means obtains the target A/F ratio by referring to a map with axes of an engine speed and the reference pulse width.

10. The engine control apparatus according to claim 1, wherein the fuel injection phase correcting means calculates air-response time constant of a cylinder intake air flow based on target air flow calculated by target air flow calculating means, cylinder intake air flow calculated or detected, intake air flow calculating means and cylinder intake air flow previously calculated or detected, and obtains the filtering reference pulse width by using air-response time constant as a time filter.

11. The engine control apparatus according to claim 1, wherein said air fuel injection phase correcting means comprises;
   an actual reference pulse width calculating means for calculating a width of the actual reference pulse per one cylinder by dividing cylinder intake air flow by engine speed and multiplying the quotient by a coefficient that can obtain the stoichiometric A/F ratio (=14.7), and
   a target throttle opening calculating means for obtaining a width of a target reference pulse by multiplying the reference pulse width by the target A/F ratio and dividing the product by the stoichiometric A/F ratio (=14.7),
   wherein a response time constant of the actual reference pulse width is calculated based on the actual reference pulse width, a previously calculated actual reference pulse width and the target reference pulse width, and the filtering reference pulse width is obtained by using the response time constant as a time-filter.

12. The engine control apparatus according to claim 1, wherein the fuel injection phase correcting means obtains the filtering reference pulse width by multiplying the reference pulse width by a ratio of cylinder intake air flow and target air flow.

13. The engine control apparatus according to claim 1, wherein if it is within a predetermined delay time from the switching of the target A/F ratio and if a ratio of cylinder intake air flow and target air flow is within a range defined by a certain threshold value, the reference pulse width itself is used as the filtering reference pulse width.

14. The engine control apparatus according to claim 1, wherein the fuel injection phase correcting means obtains filtering reference pulse width by delaying the reference pulse width by a delay time.

15. The engine control apparatus according to claim 1, wherein the fuel injection phase correcting means obtains filtering reference pulse width from the reference pulse width based on a time constant of first-order lag.

16. The engine control apparatus according to claim 15, wherein the constant time of first-order lay is obtained by learning change in cylinder intake air flow when target throttle opening is changed.

17. The engine control apparatus according to claim 16, wherein the time constant of first-order lag is obtained by learning as two setting values, in accordance with either an idle state or an off-idle state, an accelerator opening, actual throttle opening, and cylinder intake air flow.

18. The engine control apparatus according to claim 16, wherein the time constant of first-order lag is obtained by learning as a reference value of a table with an axis of a gear position, an engine speed, actual throttle opening or cylinder intake air flow.

19. The engine control apparatus according to claim 15, wherein the time constant of first-order lag is switched to one of two setting values, in accordance with either an idle state or an off-idle state, an accelerator opening, actual throttle opening, and cylinder intake air flow.

20. The engine control apparatus according to claim 15, wherein the time constant of first-order lag is obtained by referring to a table with an axis of a gear position, an engine speed, actual throttle opening, or cylinder intake air flow.

21. The engine control apparatus according to claim 15, wherein the time constant of first-order lag is obtained by referring to a map with axes of an engine speed and actual throttle opening, or a map with axes of an engine speed and cylinder intake air flow.

22. The engine control apparatus according to claim 15, wherein the time constant of first order lag is obtained by learning as a reference value of a map with axes of an engine speed and actual throttle opening, or a map with axes of an engine speed and cylinder intake air flow.

23. The engine control apparatus according to claim 14, wherein the delay time is switched to one of two setting values, in accordance with either an idle state or an off-idle state, an accelerator opening, actual throttle opening, and cylinder intake air flow.

24. The engine control apparatus according to claim 14, wherein the delay time is obtained by referring to a table with an axis of a gear position, an engine speed, actual throttle opening, or cylinder intake air flow.

25. The engine control apparatus according to claim 14, wherein the delay time is obtained by referring to a map with axes of an engine speed and actual throttle opening, or a map with axes of an engine speed and cylinder intake air flow.

26. The engine control apparatus according to claim 14, wherein the delay time is obtained by learning time from change in target throttle opening to change in a cylinder intake air flow.

27. The engine control apparatus according claim 26, wherein the delay time is obtained by learning as two setting values, in accordance with either an idle state or an off-idle state, an accelerator opening, actual throttle opening, and cylinder intake air flow.

28. The engine control apparatus according to claim 26, wherein the delay time is obtained by learning as a reference value of a table with an axis of a gear position, an engine speed, actual throttle opening, or cylinder intake air flow.

29. The engine control apparatus according to claim 14, wherein the delay time is obtained by learning as a reference value of a map with axes of an engine speed and actual throttle opening, or a map with axes of an engine speed and cylinder intake air flow.

30. The engine control apparatus according to claim 1, wherein said target filtering reference pulse width comprises;
   a means for calculating a throttle opening corresponding to engine speed feedback correction for allowing engine speed at idle to follow target engine speed,
   a means for calculating lead-corresponding throttle opening based on correction to loads of an air conditioner, a power steering, an electrical load (consumption current), an electrical radiator fan, etc., and a means for calculating a throttle opening corresponding to an accelerator opening, wherein the target throttle opening is obtained based on the target A/F ratio and the sum of the throttle opening corresponding to the feedback correction of the engine speed, the throttle opening corresponding to the loads and the throttle opening corresponding to an accelerator.

31. The engine control apparatus according to claim 1, wherein said target throttle opening calculating means further comprises target air flow calculating means for calculating target air flow, and the target throttle opening is obtained by converting the target air flow using a throttle opening.

32. The engine control apparatus according to claim 1, wherein said target throttle opening calculating means comprises;

an intake air flow calculating means for calculating or detecting a cylinder intake air flow, target air flow calculating means for calculating target air flow, and a target throttle opening feedback calculating means for calculating the target throttle opening by using feedback control in which cylinder intake air flow is allowed to follow target air flow.

33. The engine control apparatus according to claim 32, further comprising a means for setting a feedback constant of the target throttle opening feedback calculating means in accordance with the operating condition.

34. The engine control apparatus according to claim 33, wherein said feedback constant setting means switches the feedback constant to either of two setting values, in accordance with either an idle state or an off-idle state, an accelerator opening, actual throttle opening, and cylinder intake air flow.

35. The engine control apparatus according to claim 33, wherein said feedback constant setting means obtains the feedback constant by referring to a table with an axis of a gear position, an engine speed, actual throttle opening, or cylinder intake air flow.

36. The engine control apparatus according to claim 33, wherein said feedback constant setting means obtains the feedback constant by referring to a map with axes of an engine speed and actual throttle opening, or a map with axes of an engine speed and cylinder intake air flow.

37. The engine control apparatus according to claim 1, wherein said target throttle opening calculating means comprises;

an intake air flow calculating means for calculating or detecting a cylinder intake air flow, an actual reference pulse width calculating means for calculating the width of the actual reference pulse per one cylinder by dividing the cylinder intake air flow by the engine speed and multiplying the quotient by a coefficient that can obtains the stoichiometric A/F ratio (=14.7), and a target throttle opening calculating means for obtaining the width of the target reference pulse by multiplying the reference pulse width by the target A/F ratio and dividing the product by the stoichiometric A/F ratio (=14.7), a target throttle opening feedback calculating means for calculating the target throttle opening by using the feedback control in which the actual reference pulse width is allows to follow the target reference pulse width.

38. The engine control apparatus according to claim 1, wherein an actuator for providing the target throttle opening calculated by said target throttle opening calculating means is an electronically controlled throttle.

39. The engine control apparatus according to claim 1, wherein an object to be controlled is a lean-burn engine.

40. The engine control apparatus according to claim 1, wherein an object to be controlled is an in-cylinder injection engine.

* * * * *